United States Patent [19]
Lokhandwala et al.

[11] Patent Number: 5,772,733
[45] Date of Patent: Jun. 30, 1998

[54] NATURAL GAS LIQUIDS (NGL) STABILIZATION PROCESS

[75] Inventors: Kaaeid A. Lokhandwala, Menlo Park; Richard W. Baker, Palo Alto, both of Calif.

[73] Assignee: Membrane Technology and Research, Inc., Menlo Park, Calif.

[21] Appl. No.: 789,374

[22] Filed: Jan. 24, 1997

[51] Int. Cl.[6] ................................................ B01D 53/22
[52] U.S. Cl. .................. 95/39; 95/45; 95/50; 95/247; 95/258; 95/259; 95/266; 96/4; 96/188; 96/193; 585/818
[58] Field of Search .............................. 95/39, 45, 47–55, 95/243, 247, 258, 259, 266; 96/4–14, 188, 193; 585/818, 819

[56] References Cited

U.S. PATENT DOCUMENTS

| | | | |
|---|---|---|---|
| 4,367,135 | 1/1983 | Posey, Jr. | 208/108 |
| 4,374,657 | 2/1983 | Schendel et al. | 95/50 X |
| 4,386,944 | 6/1983 | Kimura | 96/4 X |
| 4,466,946 | 8/1984 | Goddin, Jr. et al. | 423/228 |
| 4,479,871 | 10/1984 | Pahade et al. | 208/340 |
| 4,548,619 | 10/1985 | Steacy | 55/16 |
| 4,617,030 | 10/1986 | Heath | 95/39 |
| 4,654,063 | 3/1987 | Auvil et al. | 96/4 X |
| 4,772,295 | 9/1988 | Kato et al. | 55/16 |
| 4,857,078 | 8/1989 | Walter | 55/16 |
| 4,936,887 | 6/1990 | Waldo et al. | 96/4 X |
| 4,994,094 | 2/1991 | Behling et al. | 95/50 X |
| 5,030,339 | 7/1991 | Czarnecki | 208/351 |
| 5,082,551 | 1/1992 | Reynolds et al. | 208/100 |
| 5,089,033 | 2/1992 | Wijmans | 55/16 |
| 5,199,962 | 4/1993 | Wijmans | 55/16 |
| 5,205,843 | 4/1993 | Kaschemekat et al. | 55/16 |
| 5,224,350 | 7/1993 | Mehra | 62/17 |
| 5,256,295 | 10/1993 | Baker et al. | 210/640 |
| 5,256,296 | 10/1993 | Baker et al. | 95/45 X |
| 5,273,572 | 12/1993 | Baker et al. | 95/48 |
| 5,281,255 | 1/1994 | Toy et al. | 95/50 |
| 5,306,331 | 4/1994 | Auvil et al. | 95/45 X |
| 5,326,385 | 7/1994 | Rajani et al. | 95/50 X |
| 5,332,424 | 7/1994 | Rao et al. | 95/50 X |
| 5,374,300 | 12/1994 | Kaschemekat et al. | 95/39 |
| 5,401,300 | 3/1995 | Lokhandwala et al. | 95/49 |
| 5,501,722 | 3/1996 | Toy et al. | 95/50 |

*Primary Examiner*—Robert Spitzer
*Attorney, Agent, or Firm*—J. Farrant

[57] ABSTRACT

An improved, membrane-based method of treating gas evolved during natural gas liquids (NGL) stabilization, to separate the very light hydrocarbon gases, methane in particular, from the heavier hydrocarbons. The membrane acts as a demethanizer and establishes a vapor/liquid equilibrium during phase separation that is different than would otherwise obtain. This can increase NGL production and reduce the weight of $C_{3+}$ hydrocarbons in the off-gas from the stabilizing phase separators.

54 Claims, 13 Drawing Sheets

NATURAL GAS LIQUIDS (NGL) STABILIZATION PROCESS

FIELD OF THE INVENTION

The invention relates to natural gas processing. In particular, the invention relates to improved membrane-based methods of stabilizing natural gas liquids.

BACKGROUND OF THE INVENTION

Natural gas is the most important fuel gas in the United States, and is also used extensively as a basic raw material in the petrochemical and other chemical process industries. The composition of natural gas varies widely from field to field. For example, a raw gas stream may contain as much as 95% methane, with small amounts of other hydrocarbons, nitrogen, carbon dioxide, hydrogen sulfide or water vapor. On the other hand, streams that contain relatively large proportions of ethane, propane, butane and heavier hydrocarbons are common. Before the raw gas can be sent to the pipeline, therefore, it must usually be treated to lower the hydrocarbon dewpoint, to avoid the risk of condensation of liquid hydrocarbons in the line. Even if dewpoint control is not an issue, higher hydrocarbons, which have higher Btu values than methane, are frequently removed to keep the Btu value of the gas within safe limits, typically 950–1050 Btu/cubic foot.

The conventional way to separate the $C_{3+}$ hydrocarbon components is a refrigerated condensation process operating down to about −40° C. Modern plants often use a cryogenic isentropic expansion method, and operate down to −100° C. The condensed natural gas liquids (NGL) separated from the gas stream are generally at high pressure, such as 500 psig, 1,000 psig, 1,500 psig or even higher, and contain significant amounts of dissolved methane and ethane. For transportation and subsequent use, the NGL must be stabilized; that is, the vapor pressure needs to be reduced, such as down to about 100 psig or 150 psig, for example. Removing the light hydrocarbons to lower the vapor pressure not only increases the value of the NGL product, but also reduces potential problems caused by later off-gassing of the light components, as the pressure and temperature of the NGL change during transport and storage.

The stabilization is done by reducing the pressure to the target value in one or multiple stages. When the pressure is reduced, the lighter gases are flashed off. The remaining NGL product is collected and sent to a pressurized storage tank or transported off-site. The flashed gas can be subjected to further treatment, repressurized and returned to the high-pressure gas line, used as fuel or flared.

Even with carefully controlled pressure reduction, however, it is difficult to avoid retention of some lighter hydrocarbons in the NGL and loss of some heavier hydrocarbons in the flashed gas. Thus, improved processing techniques that offered opportunities to reduce the size, complexity and cost of the treatment plants, and/or improve NGL product quantity or quality, would be of benefit to the industry, particularly for use on off-shore platforms.

That membranes can separate $C_{3+}$ hydrocarbons from gas mixtures, such as natural gas, is known, for example from U.S. Pat. Nos. 4,857,078, 5,281,255 and 5,501,722. Likewise, it has been recognized that condensation and membrane separation may be combined, as is shown in U.S. Pat. Nos. 5,089,033; 5,199,962; 5,205,843 and 5,374,300. However, to applicants' knowledge, membrane separation has not previously been used as described herein for natural gas stabilization.

SUMMARY OF THE INVENTION

The invention is an improved process for treating the gas that is evolved from the phase separators during NGL stabilization, so as to separate the very light hydrocarbon gases, methane in particular, from the heavier hydrocarbons. The goal is to use a membrane process to alter the equilibrium liquid and gas compositions under the phase separation conditions. One possible result is to increase the amounts of the $C_{3+}$ heavier hydrocarbon components that drop out in the liquid phase, thereby increasing the NGL yield without having to change the pressure and temperature conditions of phase separation.

Another result is to provide improved techniques and capability to achieve a stabilized NGL product, that is, an NGL product with a vapor pressure of any desired value under storage or transport conditions.

In other words, the invention provides demethanizer capability by means of a simple membrane operation.

In its most basic embodiment, the process of the invention involves two integrated operations, phase separation and membrane separation. The phase separation operation is similar to phase separation performed in prior art processes in some aspects, insofar as it involves reducing the pressure of the condensed NGL in one or more increments, and the resulting formation of distinct gas and liquid phases, which are drawn off as separate streams from the phase separation vessels.

The invention differs from prior art processes in that at least one gas stream from the phase separators is treated by membrane separation. This creates a light gas stream, which has an enriched methane content and a depleted $C_{3+}$ hydrocarbon content, and a heavy gas or vapor stream, which has an enriched $C_{3+}$ hydrocarbon content and a depleted methane content. Most widely useful embodiments of the invention include a condensation step between the phase separation and membrane separation operations. In this case, the gas stream from the phase separator is cooled to remove a portion of the heavier hydrocarbons as a liquid condensate. The remaining non-condensed portion of the gas stream passes on to be treated by membrane separation and, as before, is separated into light and heavy streams.

The phase separation operation further differs from prior art processes in that the heavy gas from the membrane separators is returned to the phase separation operation. This is preferably done in such a way as to bring the return gas stream and the liquid stream passing through the separators into equilibrating contact, explained in the Detailed Description section below. This is an important distinction over the prior art, because it can establish a vapor/liquid equilibrium in the phase separation operation that is different than would otherwise obtain in the phase separation operation under the same conditions of pressure and temperature. The result is transfer of more methane and less $C_{3+}$ hydrocarbon by weight into the gas stream than would previously have occurred at the prevailing pressure and temperature conditions. In other words, the NGL stream from the separator contains less of the very light hydrocarbons than would occur without the membrane separation step, that is, the NGL phase is demethanized.

The invention in the less common form in which the condensation step is omitted thus includes the following steps:

(a) subjecting a raw NGL stream to phase separation by pressure reduction in one or more phase separators, thereby producing a stabilized NGL stream and a gas stream;

(b) subjecting the gas stream to membrane separation, thereby producing a product gas stream enriched in methane compared with the gas stream, and a heavy stream enriched in $C_{3+}$ hydrocarbon content compared with the gas stream;

(c) returning the heavy stream to bring the heavy stream into equilibrating contact with the raw NGL stream in step (a).

The invention in the more generally useful form includes the following steps:

(a) subjecting a raw NGL stream to phase separation by pressure reduction in one or more phase separators, thereby producing a stabilized NGL stream and a gas stream;

(b) cooling the gas stream, thereby removing a portion of the $C_{3+}$ hydrocarbon content as a liquid condensate from the gas stream, and leaving a non-condensed stream;

(c) subjecting the non-condensed stream to membrane separation, thereby producing a product gas stream enriched in methane compared with the non-condensed stream, and a heavy stream enriched in $C_{3+}$ hydrocarbon content compared with the non-condensed stream;

(d) returning the heavy stream to bring the heavy stream into equilibrating contact with the raw NGL stream in step (a).

Where a series of two or more phase separators are used, steps (b) and (c), condensation and subsequent membrane separation of the non-condensed gas, can be performed on one or more of the gas streams from the individual phase separators. It is often beneficial to treat the gas stream coming from the last, lowest-pressure separator in this way, since this gas stream is the one most rich in $C_{3+}$ hydrocarbons. Furthermore, establishing a different vapor/liquid equilibrium in the last phase separator can create a stable NGL product with any desired vapor pressure.

The gas stream from the phase separator can be treated by membrane separation at the pressure of the separator. Alternatively, the gas stream may be compressed and condensed in one or more stages, with the gas from the last, highest pressure condensation being subjected to membrane separation.

Other streams within the overall process train may also be subjected to membrane separation treatment.

These treatment options bring a number of advantages. With certain raw NGL streams, it may be possible to produce an NGL product of acceptable quantity and quality just by carrying out a very simple phase separation plus membrane separation process. This can bring significant savings in equipment cost, weight and complexity, as well as operating costs and energy requirements, compared with prior art processes. This is particularly useful for off-shore wells and wells in remote locations. In other cases, the inclusion of the membrane separator can reduce the demands on the condensation and phase separation steps to achieve a comparable product. In the case of existing prior art units, retrofitting with membrane units can increase the NGL yield under existing pressure and temperature conditions.

To applicants' knowledge, such integrated processes and their inherent advantages have not previously been available for NGL stabilization.

The process of the invention may be applied to a range of raw fluid compositions, including both those high in methane content and those rich in heavier hydrocarbon content. Although the processes have been developed principally for use in NGL production, and are described herein in detail mostly as they relate thereto, it should be appreciated that such a process is useful wherever high-pressure gas/liquid mixtures of hydrocarbons are encountered.

In another aspect, the invention is an apparatus for carrying out the processes outlined above.

It is to be understood that the above summary and the following detailed description are intended to explain and illustrate the invention without restricting its scope.

DETAILED DESCRIPTION OF THE INVENTION

The term gas as used herein means a gas or a vapor.

The terms $C_{3+}$ hydrocarbon and heavier hydrocarbon mean a hydrocarbon having at least three carbon atoms.

Percentages herein are by volume unless otherwise stated.

The conventional way to separate the $C_{3+}$ hydrocarbon components is a refrigerated condensation process operating down to about $-40°$ C. Modern plants often use a cryogenic isentropic expansion method, and operate down to $-100°$ C. or below. The condensed natural gas liquids (NGL) separated from the gas stream are generally at high pressure, such as 500 psig, 1,000 psig, 1,500 psig or even higher, and contain significant amounts of dissolved methane and ethane. For transportation and subsequent use, the NGL must be stabilized; that is, the vapor pressure of the liquid has to be within specific limits.

The invention is a process for treating hydrocarbon streams, such as raw NGL condensate streams to separate the very light hydrocarbons, methane in particular, from the heavier $C_{3+}$ hydrocarbons. The invention involves using membrane separation in an integrated manner with other processing steps to treat gas evolved during gas/liquid phase separation. As stated above, the goal is to produce a stable NGL product, that is, an NGL product with a vapor pressure close to or below any pressure condition that is likely to be encountered during subsequent storage, transport or use, taking into account also temperature variations that may occur, and preferably in increased amounts than previously possible.

Figure 1:
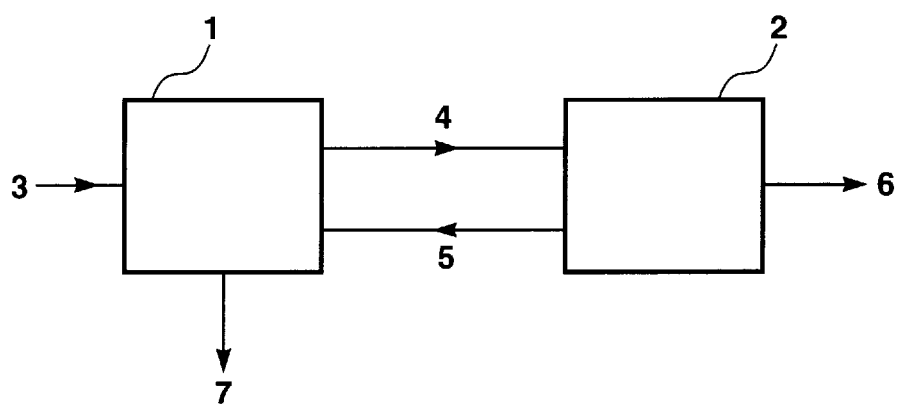
FIG. 1 is a diagrammatic representation of a basic process of the invention.

In its most basic embodiment, the process of the invention involves two integrated operations, gas/liquid phase separation and membrane separation, as shown diagrammatically in FIG. 1, where box 1 represents the phase separation step and box 2 represents the membrane separation step. An incoming stream to be treated, stream 3, passes first to the phase separation step, producing liquid stream 7. Gas that has been separated from the liquid passes as stream 4 to the membrane separation step, which produces two gas streams, 6 and 5. Stream 5 is returned to the phase separation step.

Figure 2:
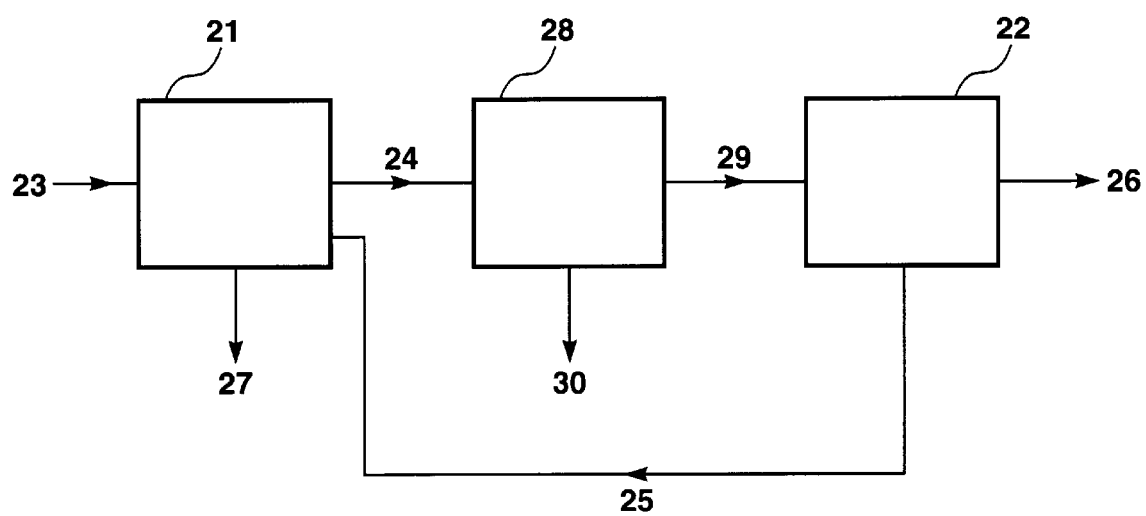
FIG. 2 is a diagrammatic representation of an alternative process of the invention.

In the more widely useful embodiment, a condensation step is included between the phase separation and membrane separation operations. FIG. 2 shows such a process in diagrammatic form. Turning to FIG. 2, box 21 represents the phase separation step, box 22 represents the membrane separation step and box 28 represents the condensation step. An incoming stream to be treated, stream 23, passes first to the phase separation step, producing liquid stream 27. The gas coming from the phase separation step, stream 24, passes to the condensation step. Here the gas is cooled to remove a portion of the heavier $C_{3+}$ hydrocarbons as a liquid condensate, stream 30. The remaining non-condensed portion of the gas stream, stream 29, passes on to be treated by membrane separation to yield streams 25 and 26 and, as before, the heavy stream from the membrane separation, stream 25, is returned to the phase separation operation.

Since the interaction of the return stream, 5 in FIG. 1 and 25 in FIG. 2, from the membrane separation step has an important effect on the phase separation step, the invention may best be understood by describing the membrane separation step first.

The Membrane Separation Step

Turning now to this step, the membrane separation operation is carried out using a membrane unit that contains a membrane that exhibits a substantially different permeability for the $C_{3+}$ hydrocarbons than for methane. It may be relatively permeable to the $C_{3+}$ hydrocarbons but relatively impermeable to methane, that is, selective for the $C_{3+}$ hydrocarbons over methane, or relatively permeable to methane but relatively impermeable to the $C_{3+}$ hydrocarbons, that is selective for methane over the $C_{3+}$ hydrocarbons.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as methane or ethane, faster than larger, more condensable molecules, such as the $C_{3+}$ hydrocarbons butane, pentane, hexane and so on. For rubbery or elastomeric polymers, the difference in size is much less critical, because the polymer chains can be flexed, and sorption effects generally dominate the permeability. Elastomeric materials, therefore, tend to permeate large, condensable molecules faster than small, low-boiling molecules.

A choice can therefore be made whether to use a glassy or an elastomeric membrane for the membrane separation step. Generally, we prefer to use an elastomeric membrane, so that the $C_{3+}$ hydrocarbon components are preferentially permeated and enriched in the permeate stream. Since the $C_{3+}$ hydrocarbons usually make up less than 50 vol % of the stream from the phase separators, a separation done in this manner typically uses less membrane area than a separation in which the bulk of the stream to be treated has to pass through the membrane. Also, elastomeric membranes usually have the benefit of higher fluxes than glassy membranes.

Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

An exception to the general guidelines above is the use of super-glassy polymer membranes to remove $C_{3+}$ hydrocarbon components preferentially. Super-glassy polymers have a rigid structure, high glass transition temperatures, typically above 100° C., 200° C. or higher, and would normally be expected to be selective for smaller, less condensable molecules over larger, more condensable molecules. However, membranes made from certain of these polymers that have unusually high free volume within the polymer material have been found to exhibit anomalous behavior, in that they preferentially permeate larger, more condensable molecules over smaller, less condensable molecules. The best known super-glassy polymer identified to date is poly (trimethylsilylpropyne) [PTMSP], the use of which to preferentially separate condensable components from lower-boiling, less condensable components is described in U.S. Pat. No. 5,281,255, for example. This type of membrane would be useful in the present invention as a membrane selective for $C_{3+}$ hydrocarbons over methane.

Although $C_{3+}$ hydrocarbon selective membranes are generally preferred for the reasons stated, embodiments using membranes selectively permeable to methane are within the scope of the invention. An example of a circumstance in which methane-selective membranes might be used is in a plant where the gas coming off the phase separation step still contains substantially more than 50 vol % $C_{3+}$ hydrocarbons. A second example might be situations where it is desired to keep the $C_{3+}$ hydrocarbon enriched stream at high pressure, and where it is acceptable to retrieve the gas stream at low pressure.

Examples of polymers that can be used to make glassy membranes include, but are not limited to, polysulfones, polyimides, polyamides, polyaramides, polyphenylene oxide, polycarbonates, ethylcellulose or cellulose acetate.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If glassy membranes are used, an integral asymmetric membrane is the preferred form.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Whatever their composition and structure, the membranes should preferably have a selectivity for n-butane over methane, or alternatively for methane over n-butane, as measured with gas mixtures, of at least about 5.

To achieve a high flux of the preferentially permeating component, the membrane layer responsible for the separation properties should be thin, preferably, but not necessarily, no more than 30 $\mu$m thick, more preferably no more than 20 $\mu$m thick, and most preferably no more than 5 $\mu$m thick. If super-glassy membranes are used, the membranes may be thicker, such as 50 $\mu$m thick or even substantially more, such as 100 $\mu$m or more, because these membranes have extraordinarily high transmembrane fluxes.

A driving force for transmembrane permeation is typically provided by a pressure difference between the feed and permeate sides of the membrane. This pressure difference can be achieved by compressing the feed stream, by drawing a vacuum on the permeate side of the membrane, or both. In general, it is preferred to operate the membranes by pressurizing the feed side and by maintaining the permeate side at atmospheric pressure, or at the pressure of the appropriate phase separation step to which the permeate will be returned, if this is not atmospheric. In this way, the permeate stream can be returned to the phase separation operation without, or with only minor, pressure adjustment. However, the manner in which the transmembrane driving force is achieved is not a critical part of the invention, and any convenient means for maintaining a suitable driving force across the membranes is within the scope of the invention. If the phase separator from which the gas comes is at a typical pressure, such as 100 psia or 200 psia, it is often convenient to supply the feed gas to the membrane at this pressure, that is, without additional compression, and to recompress the permeate for return to the phase separator. However, as discussed further below, the product gas from the membrane is often destined for the main gas pipeline, and must be recompressed in one or more stages to pipeline pressure. In this case, it is desirable to take advantage of this high pressure by positioning the membrane after the compressor or compressors, but before the gas enters the pipeline. More details of these specific arrangements are discussed below.

Referring again to FIGS. 1 and 2, the membrane separation step produces two streams, 5 and 6 in FIG. 1, and 25 and 26 in FIG. 2. Streams 6 and 26 are the light gas stream; if $C_{3+}$ hydrocarbon selective membranes are used, this stream is the residue stream; if methane-selective membranes are used, this stream is the permeate stream. Streams 5 and 25 are the $C_{3+}$ hydrocarbon enriched stream; if $C_{3+}$ hydrocarbon selective membranes are used, this stream is the permeate stream; if methane-selective membranes are used, this stream is the residue stream.

A single-stage membrane separation operation using a membrane with a selectivity of about 10 can typically remove up to about 80 or 90% of the preferentially permeating component from the feed stream and produce a permeate stream that has five times or more the concentration of that component of the feed gas. This degree of separation is adequate for many applications. If the light gas stream requires further purification, it may be passed to a second bank of modules for a second processing step. If the heavier hydrocarbon enriched stream requires further concentration, it may be passed to a second bank of modules for a second-stage treatment. Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements. Such arrangements are referred to in more detail in U.S. Pat. No. 5,256,295, which is incorporated herein by reference in its entirety.

Those of skill in the art will further appreciate that the exact configuration and performance of the membrane separation step should be chosen in accordance with the teachings above to best fit the specific environment in which the process is being used. As a guideline, in many cases even extremely modest incremental improvements, such as reducing the $C_{3+}$ hydrocarbon content of the gas that is treated by the membrane by only 5% or 10% can be beneficial in terms of overall productivity and cost effectiveness to the NGL and gas producers. However, much higher levels of removal, such as 50%, 90% or above are obviously desirable if other constraints permit.

A particular feature of the invention, especially in embodiments that use heavier hydrocarbon selective membranes, is that the composition of the product gas stream can be adjusted to any value desired by varying the parameters of the membrane separation step. Thus the $C_{3+}$ hydrocarbon content of the gas leaving the membrane separation step can be reduced to, for example, 3 mol %, 1 mol % or less, a degree of purity that may be difficult to achieve by phase separation alone, or by phase separation followed by condensation treatment of the gas phase, at least under realistic pressure and temperature operating conditions. This can be achieved by increasing the membrane area used to perform the separation. As the membrane area is increased, the amount of gas passing through to the permeate side increases, and the greater is the removal of the heavier components from the feed gas stream. As a result, however, the permeate stream is less concentrated in $C_{3+}$ hydrocarbons, necessitating a larger compressor upstream of the membrane unit to deal with the larger amounts of recirculating light gases. In situations where greater compressor capacity can be provided, however, this ability to tailor the product gas composition can be very useful.

The Phase Separation Step

Stream 5 or stream 25, the $C_{3+}$ hydrocarbon enriched stream, is the stream that is returned to the phase separation step. This stream has been enriched in heavier hydrocarbon content by withdrawing methane and ethane during the membrane separation step, and so may typically contain 10 mol %, 20 mol %, 30 mol % or more of $C_{3+}$ hydrocarbons, depending on the composition of the stream being treated and the operating parameters of the system. It should be noted that this means that this stream will likely still contain fairly large amounts of the lighter $C_1$–$C_3$ hydrocarbons, such as of the order 70 mol %, 80 mol % or more. This is markedly different from the streams that are returned to the phase separation step in prior art processes. In that case, the return streams are usually liquid condensate streams or distillation column bottom streams. Not only are these liquid, whereas the return stream from the membrane separation step is a gas or vapor, but they are usually considerably higher in $C_{3+}$ hydrocarbon content. Return of stream 5 would appear counterproductive, since it has the effect of returning significant amounts of gaseous methane to a stream from which considerable efforts are being made to remove it. However, we have recognized that this gaseous stream can be put to good use to provide an improved NGL stabilization process.

This is done by bringing the return gas stream and the liquid stream passing through the phase separation operation into equilibrating contact. By this we mean that the contact between the two streams enables mass transfer of heavier components from the return gas into the liquid phase and transfer of light components from the liquid into the gas phase. Thus, the return of the heavy gas stream provides what amounts to a combined absorption and stripping interaction between the return stream and the feed stream as it passes through the phase separation step. This establishes a different vapor/liquid equilibrium in the phase separation step at a given pressure and temperature than would otherwise obtain. In other words, the vapor/liquid equilibrium in the phase separation step is shifted in the direction of greater removal of light hydrocarbons into the gas phase and greater retention of heavier hydrocarbons in the liquid phase. Calculations demonstrating this effect are given in the Examples section below. In this way, the process can produce an NGL product containing a comparatively low level of methane; that is, with a low vapor pressure, and an off-gas product containing a low level of heavier hydrocarbons. Thus, the membrane serves as a simple but effective demethanizer.

Figure 7:
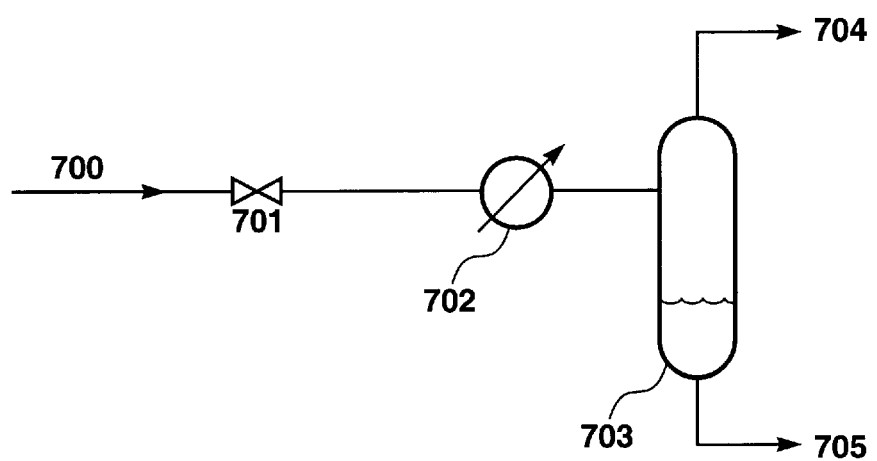
FIG. 7 is a schematic drawing of a conventional phase separator.

The equilibrating contact between the streams, which can be made either between the return gas and the raw fluid before it has been split into gas and liquid portions, or between the return gas and one of the liquid portions of the stream as it undergoes the phase separation stages, can be established in a variety of ways. The contact may take place in one partitioning stage or in multiple partitioning stages. Some representative, but non-limiting, configurations are shown in FIGS. 8–11. Before turning to these figures, for reference FIG. 7 shows a schematic representation of a typical prior art phase separation step using a simple phase separator, such as is typically employed in prior art plants treating, for example, no more than a few thousand lb/h of raw condensate. Feed 700 at high pressure passes through expansion valve 701, where the pressure is lowered, typically by 200–1,000 psi. Vaporization of a portion of the light components causes the mixture to cool. The mixture is usually reheated, to ambient temperature or above, such as 30° C. or 50° C., by passing through a heater 702, and then enters the phase separation vessel 703. Here the two phases reach an approximate equilibrium before being withdrawn as gas 704 and liquid 705.

Figure 8:
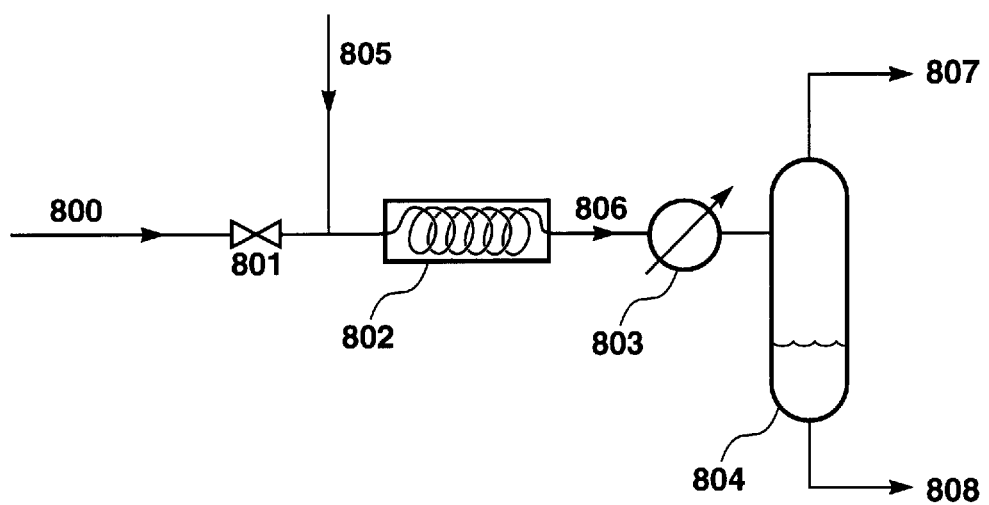
FIG. 8 is a schematic drawing of a phase separator in which equilibrating contact being achieved by means of a motionless mixer.
Figure 9:
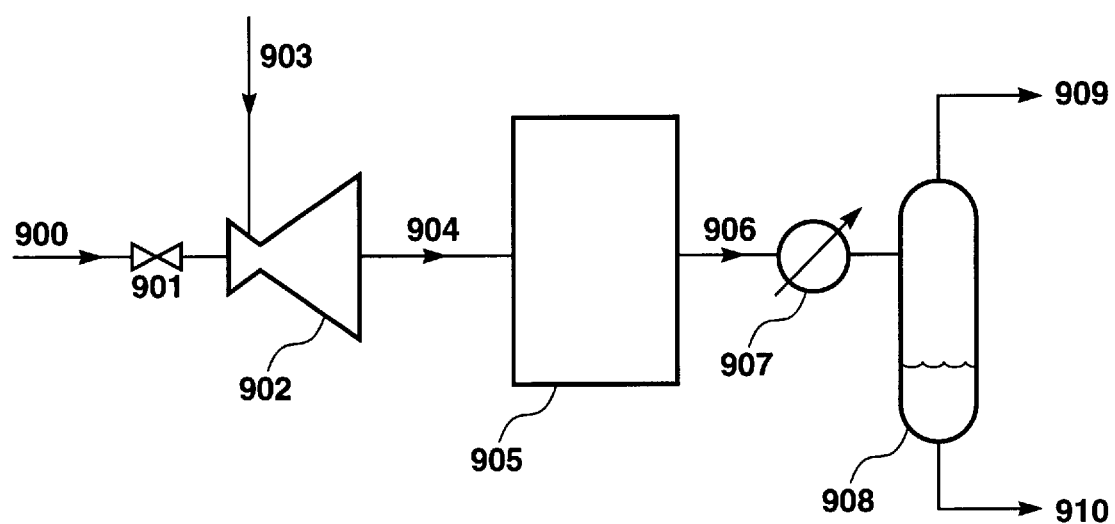
FIG. 9 is a schematic drawing of a phase separator in which equilibrating contact being achieved by means of an eductor.

FIGS. 8 and 9 show representative, non-limiting arrangements for creating a single-stage equilibrating contact between the return heavy stream and the portion of the raw stream under treatment. The streams are mixed before the stream under treatment is brought into the phase separation vessel for that stage. FIG. 8 shows equilibrating contact being achieved by running the raw incoming stream and the return gas stream together through a motionless, in-line, mixer. Feed 800 at high pressure passes through expansion valve 801. Return gas stream 805 and feed stream 800 pass together into motionless mixer 802. Feed stream 800 is cooled by expansion through the valve and is able to absorb a portion of the $C_{3+}$ hydrocarbons in stream 805. After emerging from the mixer, the stream 806 is warmed in heater 803 and then enters the phase separation chamber 804. Gas and liquid phases are withdrawn separately as streams 807 (gas) and 808 (liquid).

FIG. 9 shows equilibrating contact being achieved by running the raw incoming stream and the return gas stream together through an eductor. Feed 900 at high pressure passes through expansion valve 901 and thence into eductor 902. Return gas stream 903 is drawn into the eductor as shown and the mixed streams exit together as stream 904. This stream passes into tank 905, which is preferably equipped with baffles and/or other contact-promoting equipment. From here the equilibrated mixture 906 is warmed in heater 907 and then enters the phase separation chamber 908. Gas and liquid phases are withdrawn separately as streams 909 (gas) and 910 (liquid).

The methods of establishing equilibrating contact shown in FIGS. 8 and 9 use simple pieces of equipment, with few, if any, moving parts, that operate in a straightforward manner with little or no operator attendance and have low maintenance needs. These types of phase separation equipment are particularly suited for operation on small streams where the economics cannot support units that are costly to install, operate or maintain, and at remote fields, where operators and maintenance personnel cannot be on site continuously. They are useful for off-shore platforms, where complexity and weight of equipment are important engineering issues. They also provide a convenient method of providing the equilibrating contact of the invention by means of a retrofit to existing units already equipped with phase separation apparatus of the type shown in FIG. 7. However, equipment such as that shown provides only one theoretical partitioning stage for separating the gas and liquid phases. Although this establishes a different and improved equilibrium over that provided according to FIG. 7, the separation of light and heavy components is less perfect than would be possible if more theoretical separation stages could be provided.

Many large NGL plants use a demethanizer column for separation of the raw condensate stream. These columns employ distillation to create a light overhead gas product and a bottoms NGL stream, and may typically have five to fifteen theoretical stages, for example. If such a column is available, the equilibrating contact between the stream under treatment and the return stream may be established simply by introducing the return stream at the bottom of the column or at any other suitable point. This makes available for the equilibrating contact as many stages as are in the column from that point, and is a preferred mode of operation.

Figure 10:
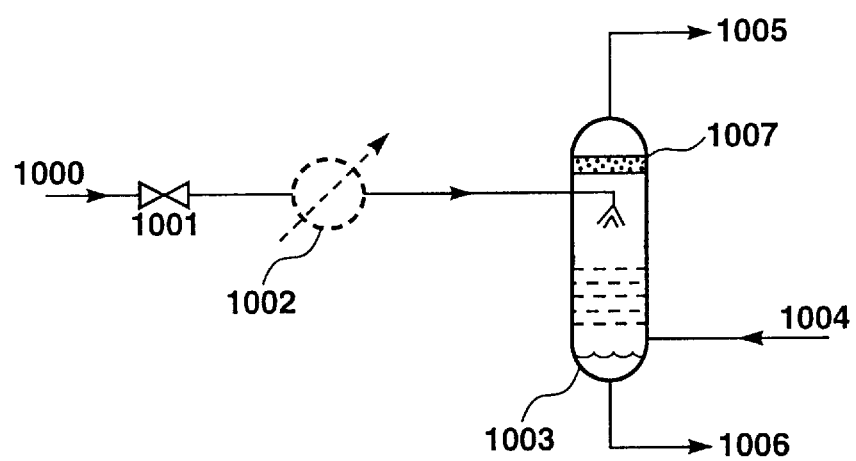
FIG. 10 is a schematic drawing of a phase separator in which equilibrating contact being achieved by means of a stripping/absorption unit.
Figure 11:
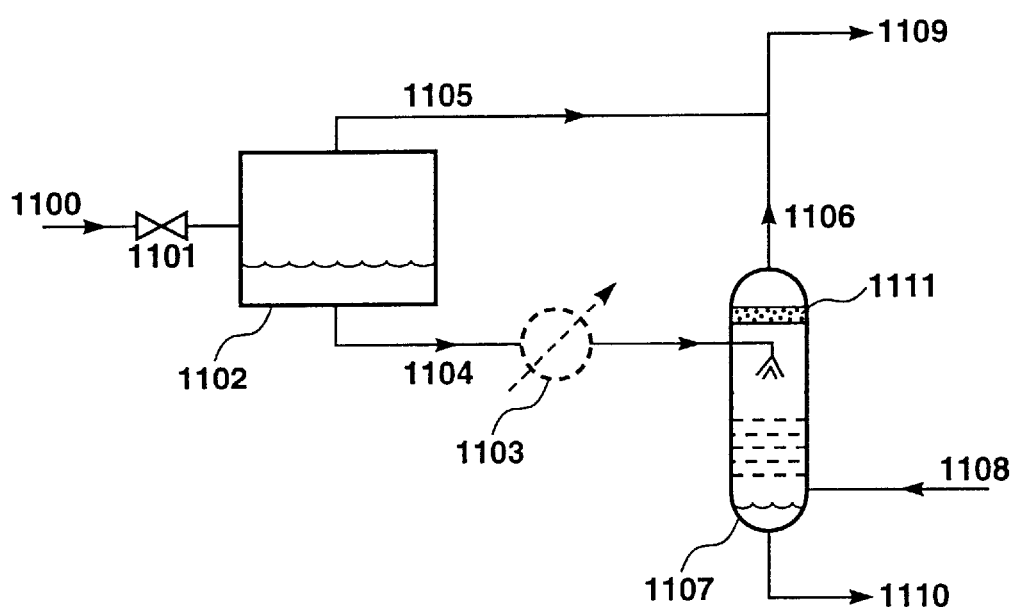
FIG. 11 is a schematic drawing of an alternative phase separator in which equilibrating contact being achieved by means of a stripping/absorption unit.

Alternatively, multiple theoretical partitioning stages can be provided by arrangements such as those shown in FIGS. 10 and 11. As shown in the Examples section below, as few as five or even three theoretical stages suffices for very good exchange of light components into the gas stream and of $C_{3+}$ hydrocarbon components into the NGL stream.

FIG. 10 shows a design in which feed 1000 at high pressure passes through expansion valve 1001 and thence into a unit 1003, which provides the potential for a combined absorption/stripping exchange between the contacting streams.

Although the unit is shown in the figure as having five trays, it may be of any type, and of any flow configuration, that enables good contact to be achieved between the NGL under treatment and the return gas stream. Examples include spray towers, trayed towers and packed towers. In a spray tower, the liquid is broken into fine droplets by pumping it through nozzles. The gas is passed up through the tower, normally countercurrent to the descending spray. In a trayed tower, gas is bubbled through liquid in a series of aeration trays. Since few stages are needed, a low-profile trayed stripper may be used. In a packed tower, a packing medium is used to maximize the gas/liquid contact surfaces. The NGL under treatment may be more viscous than liquids normally treated in strippers. If a packed tower is used, the packing should, therefore, be fairly coarse.

The preferred operating configuration is countercurrent, as shown, in which liquid passes from top to bottom of the tower and gas passes from bottom to top. Other configurations, for example, crossflow, in which liquid passes from top to bottom and gas flows in at the sides, to the center and then out at the top, may also be used.

As the return gas stream 1004 travels up the tower, heavy hydrocarbons are absorbed into the NGL phase and light hydrocarbons are stripped into the gas phase. The liquid in equilibrium with the upflowing gas is withdrawn from the bottom as stabilized stream 1006; the gas is withdrawn from the top as stream 1005. In this design heater 1002 is optional; raising the temperature of the liquid prior to the absorption/ stripping step reduces its viscosity and facilitates stripping. Mist coalescer 1007 at the top of the tower prevents carry over of NGL mist into the product gas stream.

The design and engineering issues to be taken into account in absorption or stripping columns are well known in the art. More detailed information on practical design considerations may be found, for example, in "Handbook of Separation Techniques for Chemical Engineers", P. A. Schweitzer (Editor), McGraw-Hill, New York (1979) in Chapter 3.2, entitled "Design of Gas Absorption Towers", by F. A. Zenz.

FIG. 11 shows a design similar to that of FIG. 10, except that the raw feed stream 1100 is passed through expansion valve 1101 and thence into a separation vessel 1102, to produce a gas stream 1105 and a liquid stream 1104. The liquid stream is passed to tower 1107, where it flows downward countercurrent to return gas stream 1108. In this case, therefore, the equilibrating contact takes place between the NGL portion of the raw stream and the return gas, rather than the entirety of the raw stream and the return gas. The liquid is withdrawn from the bottom as stream 1110; the gas is withdrawn from the top as stream 1106, which may be mixed with the gas stream 1105 from the separation tank to form gas stream 1109. The optional heater is shown as 1103 and the mist coalescer as 1111.

In many typical plants, NGL stabilization is accomplished by lowering the pressure of the raw condensate from, for example, 1,000 psia to, for example, 200 psia in a single phase separation step. Alternatively, the phase separation step can be performed in two, or very occasionally three or more sequential steps, at progressively lower pressure.

When multiple separators are used, each phase separator will also produce its own gas stream, and any or all of the gas sub-streams from the phase separators can be subjected to membrane treatment. In this case, it is beneficial to treat the gas stream coming from the last, lowest-pressure separator. Since the separators are operated at progressively lower pressures, the gas stream from the last separator is the one most rich in $C_{3+}$ hydrocarbons, and, therefore, most in need of treatment. Treatment of this stream will result in a comparatively high additional NGL recovery per unit membrane area used. However, this recovery is obtained at comparatively larger compressor horsepower requirement, so may not be practical in all situations.

Alternatively, the gas streams evolved from the individual separators can be pressure-adjusted as necessary, optionally individually treated by condensation, then pooled and sent as one stream to the membrane separation step. This has the benefit of creating only one gas stream, and, as explained above, the membrane unit can be configured if desired to deliver this gas product stream with a very low $C_{3+}$ hydrocarbon content.

Whether the membrane unit or units treats one or more streams from the phase separators, it is preferred to return the resulting heavy stream or streams to the last, lowest-pressure phase separator in the series, so that the equilibrating contact is established with the NGL stream being fed to this separator. This provides the greatest pressure difference between the feed and permeate sides of the membrane. Also, this is the separator that produces the NGL product, and establishing a different vapor/liquid equilibrium in this separator can create a stable NGL product with the desired pressure.

The conditions under which the last phase separator can be operated are another feature of the invention. In prior art phase separation, it is normal procedure to operate the last phase separator at a pressure lower than the lowest pressure that the NGL product is likely to encounter after it leaves the plant, taking into account also variations of temperature that may occur. However, the lower the pressure, and/or the higher the temperature of the phase separator, the more of the $C_{3+}$ components are driven off into the gas phase.

The process of the invention enables the phase separation operation to be carried out at lower pressures and warmer temperatures than previously, if required. Although this tends to drive off more of the heavier hydrocarbons, the membrane separation step will return the heavy hydrocarbon components for partitioning back into the NGL phase. Thus, this provides greater flexibility to plant designers and operators.

As a guideline, the preferred pressure of the last separator will typically be between about 50 psia and 450 psia, such as 100 psia, 150 psia, 200 psia, 250 psia or 300 psia, depending on the destination of the NGL product. If the product is to be piped, such as to a fractionation plant for recovery of individual hydrocarbon fractions, where it may be at a relatively high pressure, such as 600 psia, it may be acceptable to operate the phase separator at 300 psia, for example. On the other hand, if the NGL is to be trucked to another destination, a separator pressure as low as 50 psia may be necessary.

The Condensation Step

As was mentioned above, many or even most of the embodiments of the invention include a condensation step between the phase separation and membrane separation steps. The gas treated in the condensation step, stream 24 in FIG. 2, may be the gas evolved from the last separator, or may be any other individual or combined gas stream, including the pooled stream from all the separators.

In the condensation step, the gas is cooled to remove a portion of the heavier $C_{3+}$ hydrocarbons as a liquid condensate, stream 30. The remaining non-condensed portion of the gas stream, stream 29, passes on to be treated by membrane separation.

The fraction of the heavier hydrocarbon components remaining in the condenser vent gas after the condensation step depends on the vapor/liquid equilibrium at the operating conditions under which the condensation step is performed. If the $C_{3+}$ hydrocarbon dewpoint of the incoming stream is 50° C. at 250 psia, for example, then compressing the stream to 500–1,000 psia and cooling to 0°–10° C. can remove up to 80% or more of the component in question. It is theoretically possible to obtain as much removal as required by creating appropriate conditions of high pressure and low temperature.

In the practice of the invention, however, it is preferable only that the condensation step be designed to remove at least about 50% of the $C_{3+}$ hydrocarbon component present in the feed to the condenser, more preferably, at least about 70%. Operation under extreme conditions to achieve 90% or more removal is unnecessary, because the process does not rely on condensation alone to achieve the overall separation. For example, suppose the condensation step removes 45% of the heavier hydrocarbon component of the feed gas reaching it. If the condensation step is followed by a membrane separation step that can remove 80% of the $C_{3+}$ hydrocarbon component reaching that step, then the total removal obtained is 89%. If the condensation step removes 60%, and is followed by a membrane separation step that removes 85%, then the total removal is 94%. If the condensation step removes 70% and the membrane separation step 90%, the total removal is 97%.

The condensation step can be carried out by cooling alone, or by a combination of compression and cooling, depending to some extent on the destination of the final gas product stream leaving the process. If the gas is acceptable at low pressure, it is convenient simply to supply the gas to the chiller or condenser at the pressure of the phase separator. This might be the case, for example, if the gas is to be used for fuel, or can be supplied to a compressor elsewhere in the production train.

On the other hand, in many plants, the gas stream from the stabilization unit is mixed back into the main pipeline natural gas stream, or is returned to the raw natural gas stream upstream of the unit that produces the raw NGL condensate. In these cases, the gas must be recompressed to match the raw gas pressure or pipeline pressure, which typically may be 1,000 psia or higher. Therefore the overhead gas from the phase separator is compressed, then chilled. Examples of both types of embodiment are given below.

In either embodiment, the condensation chiller is most preferably simply an air-cooled or water-cooled chiller.

The condensation operation can be carried out in one step or a series of two, three or more sub-steps, each producing its own condensate and non-condensed streams. For example, if the gas from the phase separator is at only 50 psia, 100 psia or 150 psia, but is to be returned to a raw gas stream at 1,500 psia, then the condensation may occur in two stages at progressively higher pressures, such as 750 psia and 1,500 psia. Alternatively, but less commonly, the steps might be operated at progressively lower temperatures. Membrane steps can also be interposed between multiple condensation steps if desired.

The condensate stream or streams can pass to any destination, although normally we would return the condensate to the phase separators, either directly or after additional separation, as has conventionally been done in prior art processes. Typically, the condensate, which has a high $C_{3+}$ hydrocarbon content, can be returned to the last phase separator. Otherwise, the condensate can be returned to any separator at suitable pressure and containing a mixture of suitable composition to receive it.

It will be apparent to those of skill in the art from the description of the invention so far given that there are many possible process configurations in which membrane separation can be used in conjunction with phase separation to achieve beneficial results.

In all cases, the goal is to achieve a stabilized NGL product and a gas product capable of being sent to the pipeline, usable on site, or at least in which waste of valuable $C_{3+}$ hydrocarbons is minimized. The destination of intermediate and recycle streams can be chosen to best fit good engineering principles and the specifics of the job. For example, as already mentioned, condensate streams can be remixed with any liquid of appropriate pressure or composition. Where adjustments in pressure or temperature are needed, these can be made individually on a stream-by-stream basis or on pooled streams as convenient. Factors that may be taken into account in developing an efficient process flow scheme include: the composition and flow rate of the raw fluid; whether gases are to be pipelined, used locally, further treated, or simply flared; site-specific constraints on plant complexity; whether the process is for a new or existing well; availability of operating personnel; energy costs at site, and so on. Such considerations are familiar to design engineers and operators of gas and oil processing plants.

FIGS. 3–6, therefore, show representative, but non-limiting, most preferred embodiments for treating raw NGL condensates of typical compositions and flow rates. Other arrangements than those specifically described will no doubt suggest themselves to those of skill in the art within the scope of the teachings herein.

Figure 3:
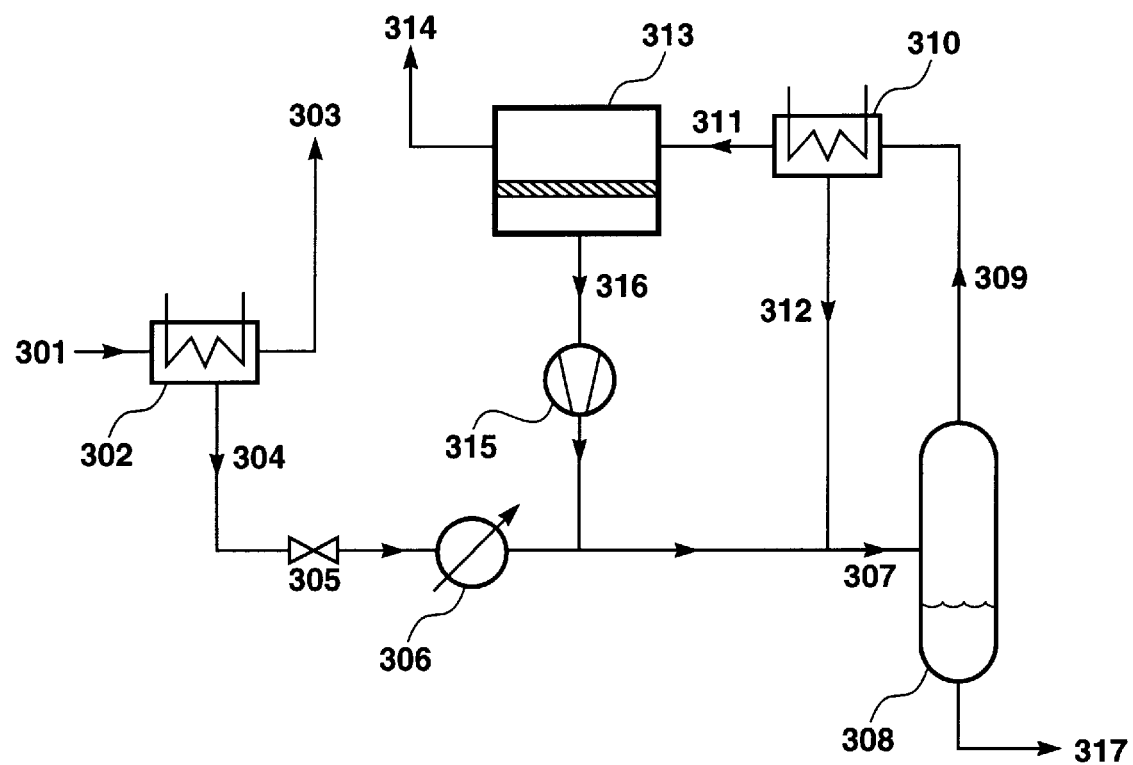
FIG. 3 is a schematic drawing of a preferred simple embodiment of the invention.

Turning now to FIG. 3, this shows in schematic form a simple embodiment, particularly suited for use in handling small flow rates of raw condensate, such as no more than the order of 2,000 lb/h. For better understanding of how our process fits an overall treatment train, this figure also shows the step that produces the raw condensate from the natural gas or other stream. This step, which does not form part of our process, is omitted from most of the other figures. Stream 301 is the gas stream from which the NGL is to be recovered. The gas is cooled, typically by simple propane refrigeration to –40° C. for small plants, but to as low as –120° C. or below for more sophisticated cryogenic plants. The cooling is represented by box 302. Partial condensation of the stream components occurs, resulting in formation of gas stream 303 and raw condensate stream 304. The raw condensate fluid to be treated enters our process as stream 304 and is reduced in pressure by expansion valve 305 and warmed in heater 306 before being mixed with streams 316 and 312 to form stream 307, and passing into phase separator 308. This is shown as a one-theoretical-stage contacting unit, so could include the types of equilibrating devices shown in FIGS. 8 and 9, not drawn here for simplicity. Alternatively any of the other types of equilibrating separators discussed above could be used. Discrete NGL product stream 317 and gas stream 309 are evolved.

Gas stream 309 passes to condenser 310. Some condensate drops out as stream 312 and is returned for mixing with stream 304. For simplicity, condenser 310 is identified by a single box from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams. The same comment applies to all other condensers shown in the figures herein. The non-condensed stream 311 is passed to membrane separation unit 313, which in this illustration contains membranes selectively permeable to the heavier hydrocarbons. The feed stream to the membrane unit in this embodiment is not further compressed, but is supplied to the membrane unit at the pressure at which it emerges from the phase separator and the condenser. The heavier hydrocarbon enriched low-pressure permeate stream 316 is recompressed in compressor 315 to the pressure of the phase separator and is returned for equilibrating with stream 304. Residue stream 314 forms the gas product from the process, and may be sent to the desired destination, including optional additional treatment.

The embodiment of FIG. 3 is advantageous in that it uses only one compressor of modest capacity. All other equipment: separators, condensers and membrane modules, is made up of simple, low-maintenance units with no moving parts. Pressures and temperatures used to carry out the process are moderate. Such an embodiment is attractive for use in remote locations, where unattended operation is needed, and the simplicity of the process train is of benefit on off-shore platforms.

Figure 4:
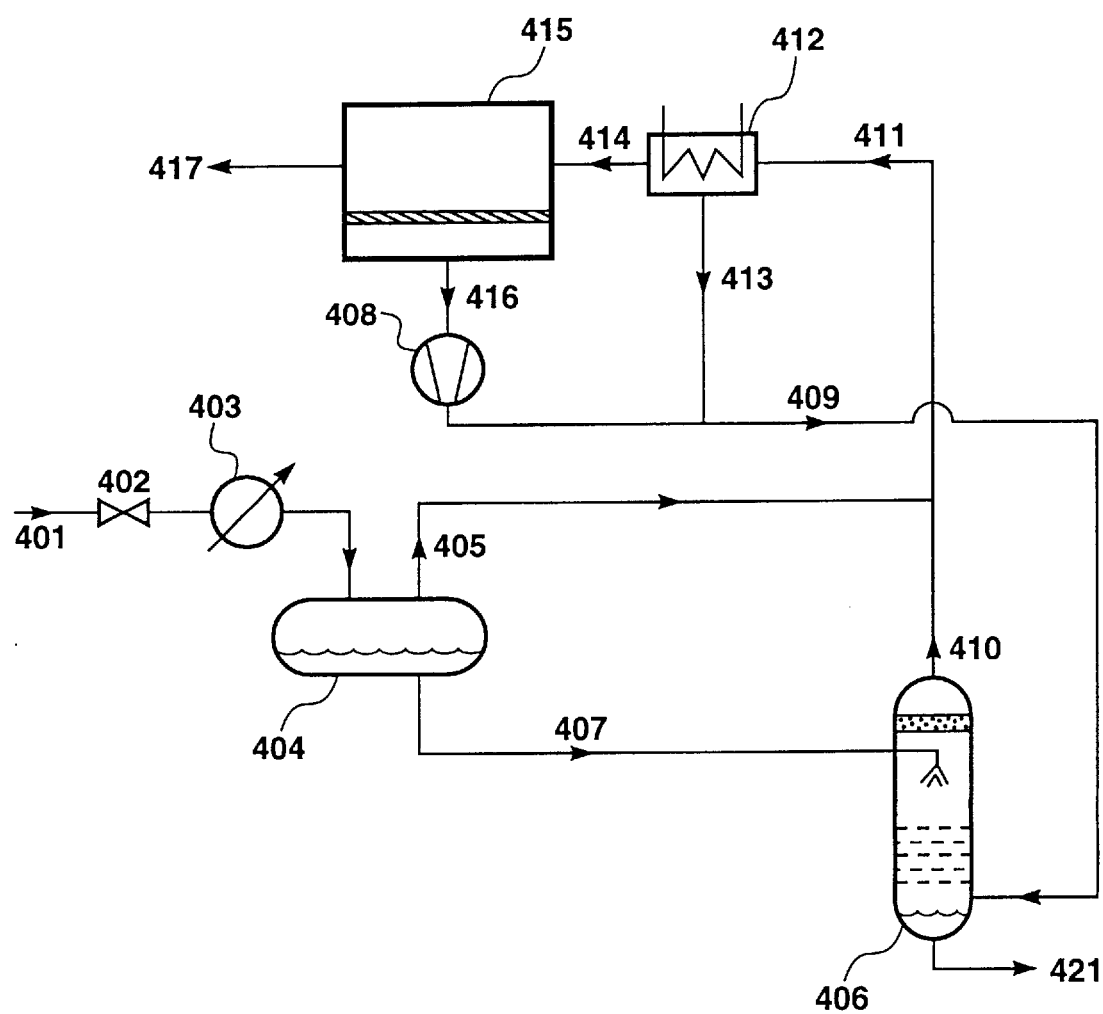
FIG. 4 is a schematic drawing of a preferred alternative embodiment of the invention.

Turning now to FIG. 4, this shows an embodiment that differs from the embodiment of FIG. 3 in that it uses a small, five-theoretical-stage stripping/absorption unit of the type shown in FIG. 10. In this embodiment, it was assumed that the raw condensate contains a relatively high entrained vapor fraction, as will often be the case, which may make good equilibrating contact in a stripper type of contactor difficult, since the vapor fraction in the condensate may pass straight out of the top of the contactor, rather than being brought into contact with the return stream. Therefore, the raw condensate stream 401 passes through expansion valve 402 and heater 403 into preliminary separation vessel 404. This vessel operates at the same temperature and pressure as separator 406, but serves to remove some the vapor fraction from the raw condensate as stream 405. The remainder of the condensate passes as stream 407 into the multi-stage separator, where NGL product stream 421 and gas stream 410 are produced. Stream 410 is combined with stream 405 to form stream 411, which passes to condenser 412. The non-condensed stream 414 is passed to membrane separation unit 415. Heavier hydrocarbon enriched stream 416 is recompressed in compressor 408 and returned as a stripping gas, 409, to separator 406. Residue stream 417 is withdrawn as the product gas stream from the process. The condensate stream 413 is mixed with the recompressed permeate stream, 409, for return to the separator.

The embodiment of FIG. 4 is more complicated than that of FIG. 3, insofar as the absorption/stripping conditions must be set to provide good exchange of heavier hydrocarbons into the downward-flowing liquid and of light hydrocarbons into the upward-flowing gas. Nevertheless, the unit itself is small and can operate under moderate pressure and temperature conditions without continuous monitoring.

Figure 5:
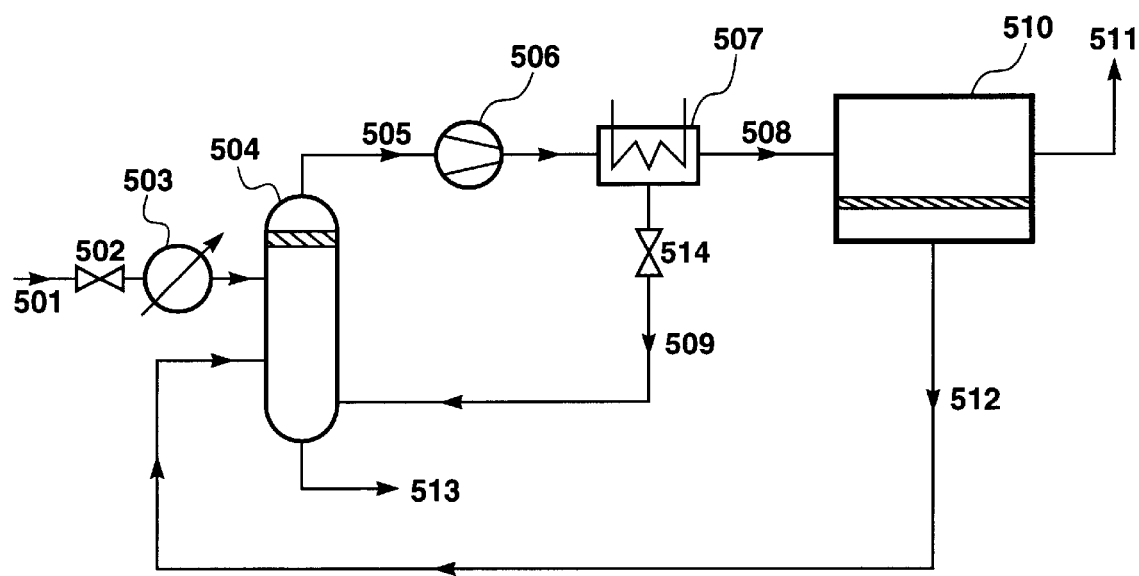
FIG. 5 is a schematic drawing of a preferred embodiment of the invention that produces a high pressure gas stream.

A representative embodiment of a process in which compression and cooling are used is shown in FIG. 5. Stream 501 is reduced in pressure by expansion valve 502, optionally heated by heater 503 and passed into separator 504. In this example, the separator can be any of the types already discussed, including a demethanizer column, a simple one-stage separator or an absorption/stripping unit. Overhead gas stream 505 passes to compressor 506 for compression to any desired pressure, and thence to aftercooler or chiller 507, where it is cooled, such as to about 30° C. Partial condensation occurs, producing condensate stream 509, which is reduced in pressure by valve 514 and returned to the separator column. The non-condensed stream 508 passes to membrane separation unit 510 for treatment. The heavier hydrocarbon enriched, low-pressure permeate stream 512 is returned as equilibrating medium to the phase separator. The stabilized NGL product is withdrawn as bottom product stream 513. The treated gas product stream is withdrawn as residue stream 511.

Figure 6:
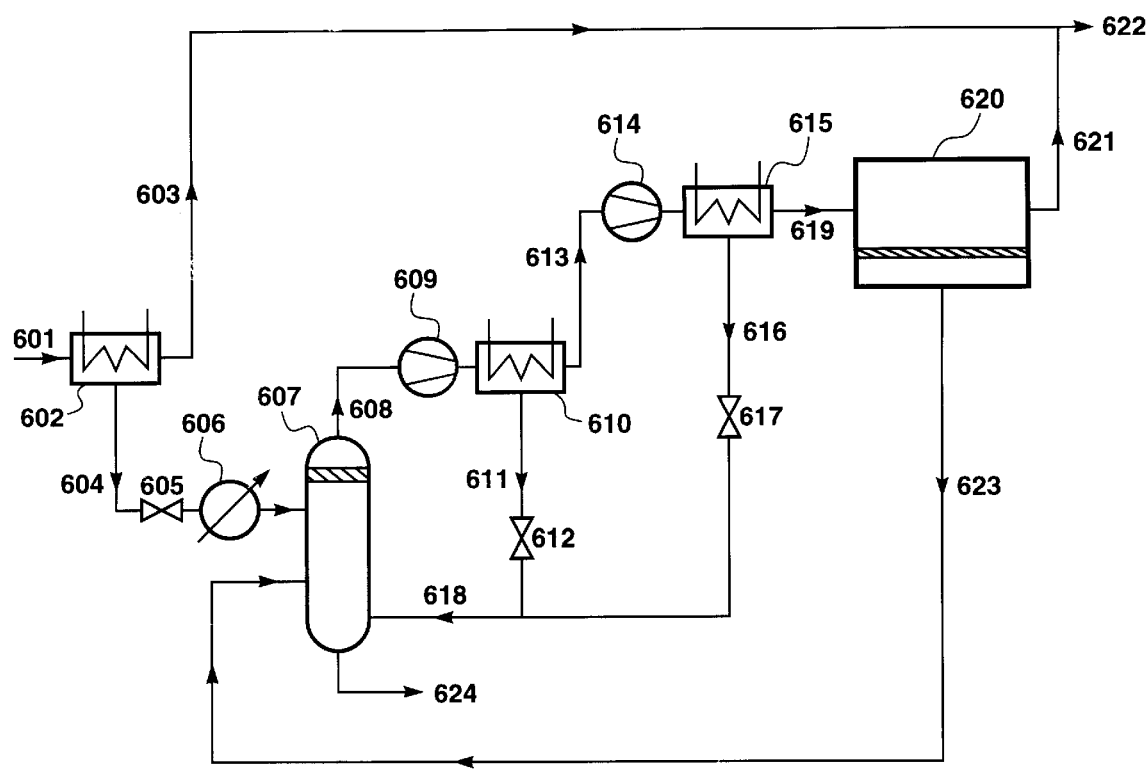
FIG. 6 is a schematic drawing of a preferred embodiment of the invention using multiple compression/cooling steps.

FIG. 6 shows an embodiment that also involves compression of the gas stream, but in which compression is performed in two stages. Like FIG. 3, this figure also shows the step that produces the raw condensate from the natural gas or other stream upstream of our process. Stream 601 is the gas stream from which the NGL is to be recovered. The gas is cooled in unit 602, to produce gas stream 603, which is assumed to pass to the main gas pipeline, and raw condensate 604. The raw condensate passes through expansion valve 605 and heater 606 into phase separator 607, which may be of any type within the scope of the invention. Overhead gas stream 608 is compressed in compressor 609 to a pressure, such as for example 500 psia, intermediate between the phase separator pressure and the pipeline pressure. The gas then passes to condenser or aftercooler 610. Partial condensation occurs, producing condensate stream 611, which is reduced in pressure by valve 612 and returned to the separator column. The non-condensed stream 613 passes to compressor 614, in which it is compressed to a final pressure a little higher, such as for example 10 psi or 20 psi, higher than the desired pipeline entry pressure, to allow for pressure drops along the feed channel of the membrane modules. The stream then passes to aftercooler or condenser 615, where second condensate stream 616 is produced. This stream is reduced in pressure by valve 617 and combined with stream 611 to form stream 618 for return to the phase separator. Non-condensed stream 619 passes to membrane separation unit 620 for treatment. The heavier hydrocarbon enriched, low-pressure permeate stream 623 is returned as equilibrating medium to the phase separator. The stabilized NGL product is withdrawn as bottom product stream 624. The treated gas product stream is withdrawn as residue stream 621 and sent with stream 603 to the pipeline stream 622. As an alternative, if gas stream 621 does not meet pipeline specification, it can be returned upstream of unit 602.

Figure 13:
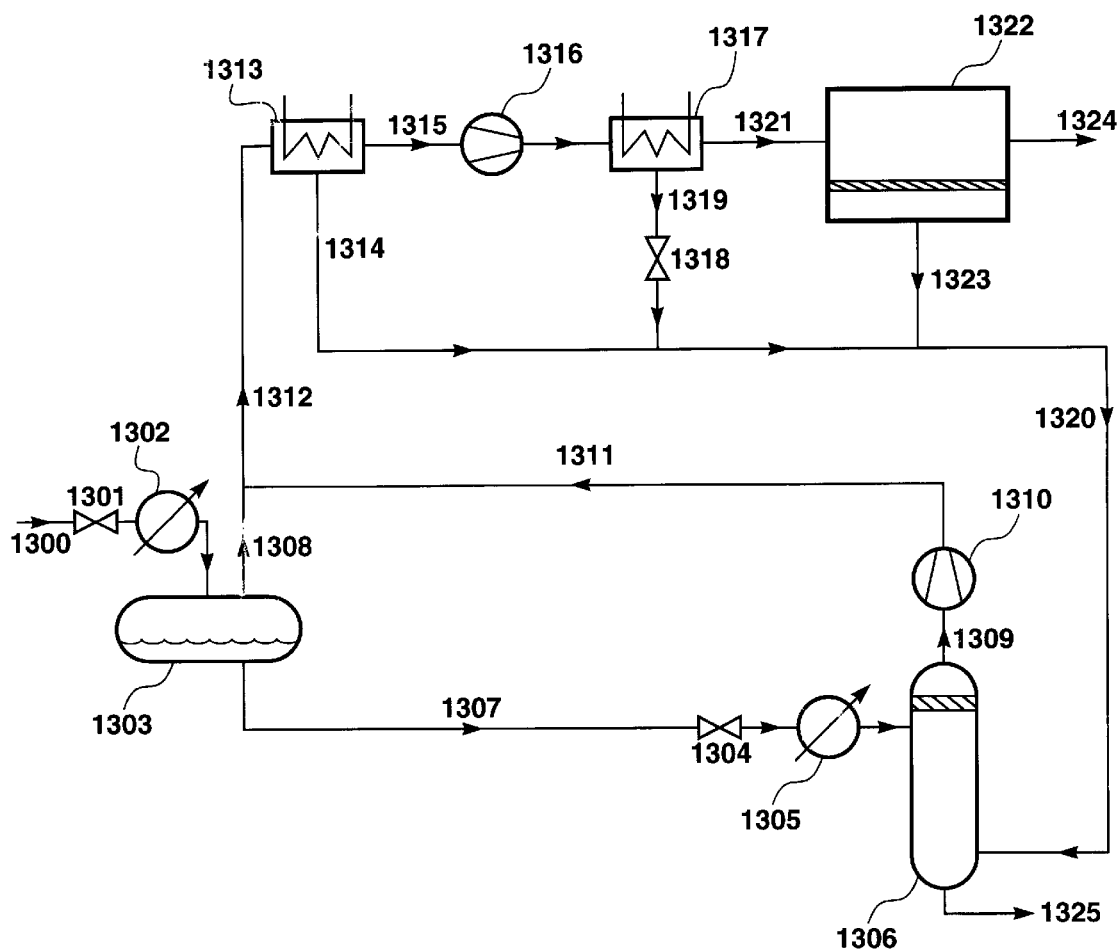
FIG. 13 is a schematic drawing of an embodiment of the invention in which multiple phase separators are used.

An embodiment of the invention in which the gas from two phase separators operating at progressively lower pressure is treated is shown in FIG. 13. Turning to this figure, stream 1300 is reduced in pressure by expansion valve 1301, heated by heater 1302 and passed into separator 1303, where discrete liquid stream 1307 and gas stream 1308 are evolved. The pressure of liquid stream 1307 is further reduced as it passes through expansion valve 1304 into heater 1305 and second separator 1306.

The evolved gases are withdrawn from each separator as high-pressure stream 1308 and low-pressure stream 1309. Stream 1309 is repressurized by compressor 1310 and the repressurized gas stream 1311 is mixed with gas from the first separator to form gas stream 1312. This stream is cooled in after-cooler or condenser 1313, such as to about 30° C. Partial condensation occurs, producing condensate stream 1314. The non-condensed stream 1315 is compressed in compressor 1316 and chilled in condenser or after-cooler 1317. Part of the condenser cooling could be achieved by running the stream against other cold streams, such as the membrane permeate and residue stream, in heat-exchangers. For simplicity, this is not shown in the figure. Additional cooling is provided by a refrigerated chiller. The pressure of condensate stream 1319 is lowered by valve 1318 and this stream is combined with condensate stream 1314 and permeate stream 1323 to form stream 1320. Non-condensed stream 1321 is passed to membrane separation unit 1322 for treatment. The heavier hydrocarbon enriched, low-pressure permeate stream 1323 is mixed with condensate streams 1314 and 1319 and returned as stripping gas to the bottom of absorber/stripper or demethanizer 1306. The stabilized NGL product is withdrawn as bottom product stream 1325. The treated gas product stream is withdrawn as residue stream 1324 and sent to the pipeline or elsewhere.

The invention also includes apparatus for separating liquid/gas mixtures according to the diverse process possibilities, such as using the combinations and connections of separators, condensers, compressors, membrane units and so on as shown in FIGS. 3–11 and 13.

Those of skill in the art will appreciate that the apparatus used to carry out the separation may, of course, include other ancillary components, such as additional pumps, blowers, valves, heaters or coolers as desired.

Those of skill in the art will also appreciate that many other specific process arrangements, particularly with regard to placement of the membrane unit or units in the process scheme, are possible within the scope of the invention. For example, different arrangements that may be appropriate in some NGL stabilization plants may be found in co-owned and copending Ser. No. 08/789,371; entitled "Membrane Separation of Associated Gas", which is incorporated herein by reference in its entirety.

When the membrane separation step uses a membrane that is organic-selective, that is, is selective for the $C_{3+}$ hydrocarbon components over methane, the residue and permeate streams from the membrane unit may be significantly colder than the membrane feed stream. This phenomenon, which is believed to arise because of Joule-Thomson cooling as the organic vapor expands across the membrane to the permeate side, is likely to occur if the membrane has a reasonably good selectivity for the $C_{3+}$ hydrocarbons over methane, such as about 5 or more, these components have a combined reasonably high concentration in the feed to the membrane unit, such as about 5%, 10% or more, and their removal from the membrane feed into the permeate is reasonably high, such as about 50%, 80%, 90% or more. The phenomenon is discussed in more detail in co-owned and copending Ser. No. 08/788,629, entitled "Membrane Expansion Process for Organic Component Recovery From Gases", which is incorporated herein by reference in its entirety.

Since the conditions mentioned above frequently obtain during treatment of NGL stabilization off-gases according to the teachings herein, the membrane residue and permeate streams may typically be 5° C., 10° C. or more colder than the feed to the membrane unit, and it may be both convenient and beneficial to use one or both cold streams from the membrane separation step to provide or supplement cooling for the condensation step. For example, in FIG. 5 one or both of streams 511 and 512 could be used for heat exchange in condenser 507 before being passed to their next destinations, as could streams 416 and 417 in FIG. 4, or streams 314 and 316 in FIG. 3, and so on.

The process of the invention provides an attractive option for the NGL stabilization portion of a gas treatment train. Such a train may be located at a site where the membrane separation capabilities of the membrane unit could be taken advantage of in other aspects. As just one example, the site may contain storage tanks containing hydrocarbon liquids that vent gas in response to changing temperature and pressure conditions. In some cases, it may be possible to feed the vent gas into our process for treatment. For instance, when embodiments such as those of FIGS. 5, 6 or 13 are used, the vent gas stream could be introduced as part of the feed to main compressors 506, 609, 614 or 1316, as in fact could be any other hydrocarbon gas stream of suitable composition that would benefit from the additional separation provided by the membrane unit. In another aspect, therefore, the invention includes embodiments in which an additional stream is introduced for treatment to the inlet of the process compressor or compressors. This stream might come from a part of the total gas treatment train that removes contaminants such as water vapor, acid gases, nitrogen or the like, from other hydrocarbon adjustment or fractionation operations, from storage tanks, transfer operations or any of the other sources that will be familiar to those of skill in the art.

Alternatively, of course, separate stand-alone membrane systems, or integrated condensation/membrane separation systems, such as those described in U.S. Pat. Nos. 5,089,033; 5,199,962; 5,205,843 and 5,374,300 can be installed to treat storage tank vents or any of these other types of stream.

The invention is now illustrated by the following examples, which are intended to further clarify understanding of the invention, but are not intended to limit the scope or underlying principles in any way.

EXAMPLES

Example 1

A set of calculations was performed to compare the compositions of the product gas and liquid fractions from a phase separator assuming:

(a) no additional treatment of the gas stream from the separator was performed;

(b) the gas stream was treated by condensation by cooling without pressure increase;

(c) the gas stream was treated by a combination of condensation as above and membrane separation;

(d) the gas stream was treated by a combination of condensation as above and membrane separation, and the heavy hydrocarbon-enriched stream from the membrane separation step was returned and equilibrated with the stream entering the phase separator.

Only treatment option (d) is in accordance with the invention.

In each case the calculation was performed using Chem-Cad III software (Chemstations Inc., Houston, Tex.) to model the separation. In all cases, the condensate feed stream to the separator was assumed to be 152 lbmol/h of composition:

| | |
|---|---|
| Methane | 42.5 mol % |
| Ethane | 17.1 |
| Propane | 17.2 |
| n-Butane | 14.6 |
| n-Pentane | 3.9 |
| n-Hexane | 4.8 | and the phase separation was assumed to be carried out at 35° C. and 150 psia.

(a) No additional treatment. (Not in accordance with the invention)

The compositions and flow rates of the two-phase feed mixture, the gas phase from the separator and the liquid phase from the separator were calculated to be as shown in Tables 1 and 2.

In this case, the gas phase is produced at a rate of 4,065 lb/h, of which 48.3 mol % is methane, and 15.3 mol % is $C_{4+}$ hydrocarbons.

TABLE 1

|  | Feed | Gas phase | Liquid phase |
|---|---|---|---|
| Flow (lbmol/h) | 152 | 132 | 19.4 |
| Temp (°C.) | 35 | 35 | 35 |
| Pressure (psia) | 150 | 150 | 150 |
| Component (mol %) | | | |
| Methane | 42.5 | 48.3 | 2.7 |
| Ethane | 17.1 | 18.8 | 5.3 |
| Propane | 17.2 | 17.5 | 14.8 |
| n-Butane | 14.6 | 12.0 | 32.4 |
| n-Pentane | 3.9 | 2.1 | 15.8 |
| n-Hexane | 4.8 | 1.2 | 28.9 |

TABLE 2

|  | Feed | Gas phase | Liquid phase |
|---|---|---|---|
| Flow (lb/h) | 5,301 | 4,065 | 1,235 |
| Component flow (lb/h) | | | |
| Methane | 1,035 | 1,027 | 8.4 |
| Ethane | 778 | 747 | 30.9 |
| Propane | 1149 | 1,023 | 127 |
| n-Butane | 1,288 | 923 | 365 |
| n-Pentane | 427 | 205 | 221 |
| n-Hexane | 624 | 141 | 483 |

(b) Treatment by condensation alone. (Not in accordance with the invention)

In this case, the gas stream from the phase separator was assumed to be cooled to 30° C. The resulting condensate was assumed to be added back to the separator and the condenser off-gas formed the gas phase product. The compositions and flow rates of the two-phase feed mixture, the non-condensate gas phase and the liquid phase from the separator were calculated to be as shown in Tables 3 and 4.

TABLE 3

|  | Feed | Gas product | Liquid phase |
|---|---|---|---|
| Flow (lbmol/h) | 152 | 130 | 22 |
| Temp (°C.) | 35 | 30 | 35 |
| Pressure (psia) | 150 | 150 | 150 |
| Component (mol %) | | | |
| Methane | 42.5 | 49.1 | 2.7 |
| Ethane | 17.1 | 19.0 | 5.3 |
| Propane | 17.2 | 17.6 | 14.8 |
| n-Butane | 14.6 | 11.6 | 32.6 |
| n-Pentane | 3.9 | 1.9 | 15.9 |
| n-Hexane | 4.8 | 0.8 | 28.7 |

TABLE 4

|  | Feed | Gas phase | Liquid phase |
|---|---|---|---|
| Flow (lb/h) | 5,301 | 3,927 | 1,374 |
| Component flow (lb/h) | | | |
| Methane | 1,035 | 1,026 | 9.4 |
| Ethane | 778 | 744 | 34.4 |
| Propane | 1,149 | 1,008 | 141 |
| n-Butane | 1,288 | 879 | 408 |
| n-Pentane | 427 | 179 | 248 |
| n-Hexane | 624 | 91.0 | 533 |

As can be seen by comparing Tables 2 and 4, the weight of the gas fraction is reduced from 4,065 lb/h to 3,927 lb/h by the condensation treatment, and by comparing Tables 1 and 3, the gas composition is reduced from 15.3 mol % $C_{4+}$ hydrocarbons to 14.3 mol % $C_{4+}$ hydrocarbons. The methane content of the gas is increased from 48.3 mol % to 49.1 mol %.

(c) Treatment by condensation and membrane separation. (Not in accordance with the invention)

Figure 12:
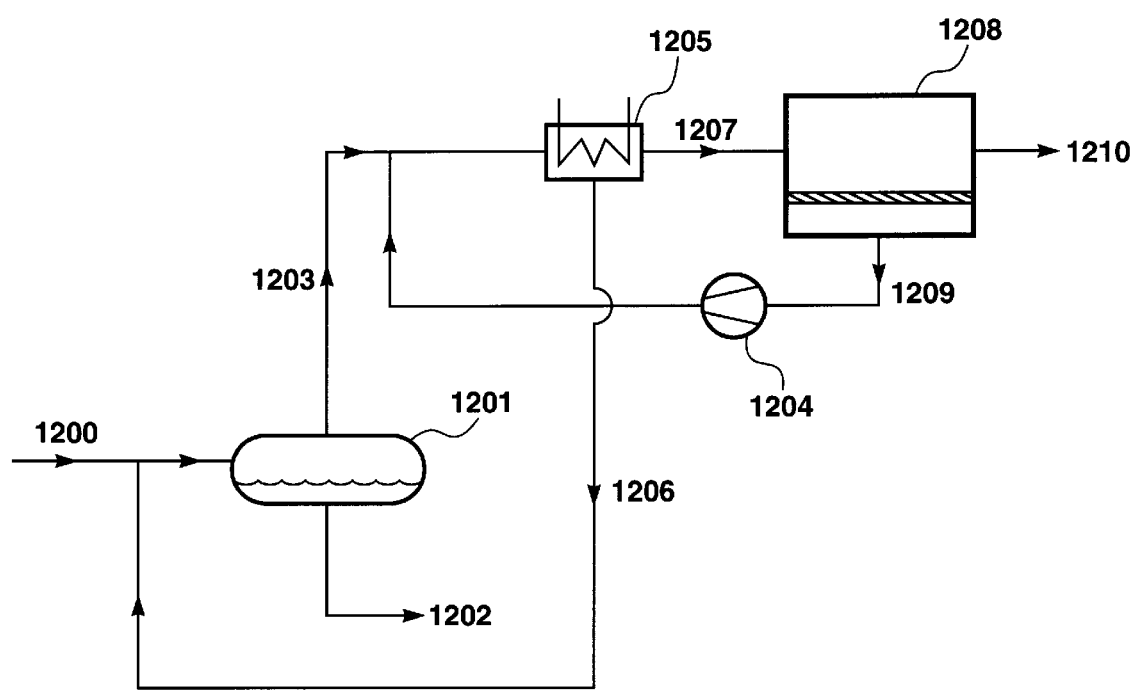
FIG. 12 is a schematic drawing of a process not in accordance with the invention in which the heavier-hydrocarbon-enriched stream from the membrane unit is not returned to the phase separation step.

This case is assumed to be as shown in FIG. 12, and is not in accordance with the invention. Referring to that figure, feed stream, 1200, enters phase separator 1201. The liquid NGL phase is withdrawn as stream 1202. The gas phase, 1203, from the separator is cooled to 30° C. in condenser 1205. The condensate stream, 1206, from the condenser is added back to the separator. The condenser off-gas, stream 1207, is passed to membrane unit 1208, which was assumed to contain a membrane selective for the heavier hydrocarbons over methane and have the following permeation properties:

| Gas: | Methane | Pressure normalized flux | 160 |
|---|---|---|---|
|  | Ethane | ($\times 10^{-6}$ cm$^3$ (STP)/cm$^2 \cdot$ s $\cdot$ cmHg) | 320 |
|  | Propane |  | 640 |
|  | n-Butane |  | 1,200 |
|  | n-Pentane |  | 1,600 |
|  | n-Hexane |  | 2,400 |

The gas is separated into residue stream 1210, which is the light gas product, and permeate stream 1209, enriched in the heavier hydrocarbons. The permeate side of the membrane is at atmospheric pressure, so stream 1209 is recompressed to 150 psia in compressor 1204 before returning to the condenser inlet. The compositions and flow rates of the streams were calculated to be as shown in Tables 5 and 6.

As can be seen by comparing Tables 4 and 6, the weight of the gas fraction is reduced from 3,927 lb/h, using condensation treatment alone, to 3,040 lb/h using the combination of condensation and membrane separation treatment. The gas composition is reduced from 14.1 mol % $C_{4+}$ hydrocarbons (Table 3) to 6.1 mol % $C_{4+}$ hydrocarbons (Table 5). Likewise, the weight of the NGL recovered is increased from 1,374 lb/h (Table 4) to 2,261 lb/h (Table 6).

TABLE 5

| Stream | 1200 | 1202 | 1203 | 1206 | 1207 | 1209 | 1210 |
|---|---|---|---|---|---|---|---|
| Flow (lbmol/h) | 152 | 37 | 144 | 29.4 | 226 | 111 | 115 |
| Temp. (°C.) | 35 | 35 | 35 | 30 | 30 | 22 | 22 |
| Pressure (psia) | 150 | 150 | 150 | 150 | 150 | 15 | 150 |
| Component (mol %): | | | | | | | |
| Methane | 42.5 | 2.6 | 44.6 | 2.2 | 34.0 | 11.8 | 55.4 |
| Ethane | 17.1 | 5.1 | 18.0 | 6.5 | 21.3 | 21.7 | 20.9 |
| Propane | 17.2 | 16.0 | 18.9 | 24.1 | 25.4 | 33.5 | 17.6 |
| n-Butane | 14.6 | 41.8 | 15.6 | 54.0 | 18.0 | 30.6 | 5.8 |
| n-Pentane | 3.9 | 15.1 | 2.1 | 9.3 | 1.2 | 2.2 | 0.3 |
| n-Hexane | 4.8 | 19.5 | 0.8 | 4.0 | 0.1 | 0.3 | 0.02 |

TABLE 6

| Stream | 1200 | 1202 | 1203 | 1206 | 1207 | 1209 | 1210 |
|---|---|---|---|---|---|---|---|
| Flow (lb/h) | 5,301 | 2,261 | 4,639 | 1,599 | 7,790 | 4,750 | 3,040 |
| Component flow (lb/h): | | | | | | | |
| Methane | 1,035 | 15.3 | 1,030 | 10.2 | 1,231 | 211 | 1,020 |
| Ethane | 778 | 56.5 | 779 | 57.1 | 1,445 | 724 | 722 |
| Propane | 1,149 | 261 | 1,200 | 312 | 2,528 | 1,640 | 888 |
| n-Butane | 1,288 | 902 | 1,308 | 923 | 2,362 | 1,977 | 385 |

TABLE 6-continued

| Stream | 1200 | 1202 | 1203 | 1206 | 1207 | 1209 | 1210 |
|---|---|---|---|---|---|---|---|
| n-Pentane | 427 | 404 | 219 | 196 | 196 | 173 | 23.4 |
| n-Hexane | 624 | 622 | 103 | 101 | 28.2 | 26.0 | 2.2 |

Membrane area required: 75 m$^2$
Horsepower requirement: 116 hp (d) Treatment by condensation/membrane separation, with heavy hydrocarbon-enriched stream from the membrane separation step equilibrated with feed stream. (In accordance with the invention)

This case is assumed to be as shown in FIG. 3, except that the condensate stream 312 was assumed to be introduced into the phase separator as a separate stream. Membrane permeate stream 316 was assumed to be recompressed to 150 psia before mixing with stream 304. The gas phase, 309, from the separator was assumed to be cooled to 30° C. in condenser 310. The membrane unit was assumed to contain a membrane having the same permeability properties as in case (c). The compositions and flow rates of the streams were calculated to be as shown in Tables 7 and 8.

In this case, the process produces 2,788 lb/h of gas with a methane content of 58 mol %, and 2,512 lb/h of NGL.

Compared with case (b), treatment by condensation alone, as is frequently performed now, the process of the invention produces 1,139 lb/h less gas and more liquid, that is, over 80% more NGL, operating at the same pressure and temperature conditions of condensation. The gas fraction from treatment by condensation alone contains about 1,150 lb/h of C$_{4+}$ hydrocarbons, compared with only about 300 lb/h for the gas fraction produced by the process of the invention.

TABLE 7

| Stream | 304 | 309 | 312 | 311 | 316 | 314 | 317 |
|---|---|---|---|---|---|---|---|
| Flow (lbmol/h) | 152 | 219 | 6.4 | 212 | 103 | 109 | 42.5 |
| Temp. (°C.) | 35 | 35 | 30 | 30 | 23 | 23 | 35 |
| Pressure (psia) | 150 | 150 | 150 | 150 | 15 | 150 | 150 |
| Component (mol %): | | | | | | | |
| Methane | 42.5 | 35.5 | 2.3 | 36.5 | 13.5 | 58.2 | 2.1 |
| Ethane | 17.1 | 22.2 | 6.9 | 22.6 | 24.1 | 21.2 | 6.3 |
| Propane | 17.2 | 24.2 | 22.9 | 24.3 | 33.3 | 15.8 | 20.6 |
| n-Butane | 14.6 | 15.4 | 44.0 | 14.6 | 25.4 | 4.3 | 41.0 |
| n-Pentane | 3.9 | 1.9 | 12.5 | 1.6 | 2.9 | 0.3 | 13.1 |
| n-Hexane | 4.8 | 0.7 | 11.5 | 0.4 | 0.8 | 0.06 | 16.9 |

TABLE 8

| Stream | 304 | 309 | 312 | 311 | 316 | 314 | 317 |
|---|---|---|---|---|---|---|---|
| Flow (lb/h) | 5,301 | 7,442 | 365 | 7,078 | 4,290 | 2,788 | 2,512 |
| Component flow (lb/h): | | | | | | | |
| Methane | 1,035 | 1,247 | 2.3 | 1,245 | 224 | 1,021 | 14.4 |
| Ethane | 778 | 1,458 | 13.2 | 1,445 | 747 | 698 | 80.5 |
| Propane | 1,149 | 2,338 | 64.5 | 2,274 | 1,511 | 762 | 386 |
| n-Butane | 1,288 | 1,963 | 164 | 1,799 | 1,524 | 275 | 1,012 |
| n-Pentane | 426 | 297 | 57.6 | 239 | 212 | 26.7 | 400 |
| n-Hexane | 624 | 139 | 63.4 | 76.0 | 70.6 | 5.5 | 619 |

Membrane area required: 75 m$^2$
Horsepower requirement: 108 hp

A summary of the difference in results for calculations (a) through (d) is given in Table 9.

TABLE 9

| Treatment | NGL produced (lb/h) | Gas produced (lb/h) | Methane content of gas (mol %) |
|---|---|---|---|
| (a) None | 1,235 | 4,066 | 48.3 |
| (b) Condensation at 30° C. | 1,374 | 3,927 | 49.1 |
| (c) Membrane 75 m$^2$ membrane | 2,261 | 3,040 | 55.4 |
| (d) Invention 75 m$^2$ membrane | 2,512 | 2,788 | 58.2 |

Example 2

(Not in Accordance with the Invention)

A set of calculations was performed according to the assumptions as in case (b) of Example 1, that is, the gas phase from the phase separator was assumed to have the same raw composition as in Example 1, and to be treated by condensation alone. The temperature to which the gas was assumed to be chilled in the condenser was varied. As before, the calculations were done with ChemCad III software. The results are summarized in Table 10. The column entitled "Fractional improvement in recovery" expresses the reduction in gas production compared with the "no condensation" case.

TABLE 10

| Condensation temperature (°C.) | NGL production (lb/h) | Gas production (lb/h) | Fractional improvement in recovery (%) | Methane content of gas (mol %) |
|---|---|---|---|---|
| No condensation | 1,235 | 4,065 | — | 48 |
| 30 | 1,374 | 3,927 | 3.4 | 49 |
| 20 | 1,651 | 3,650 | 10.2 | 51 |
| 10 | 1,976 | 3,325 | 18.2 | 53 |
| 0 | 2,315 | 2,985 | 26.6 | 56 |

Cooling to 30° C. can usually be achieved by air cooling. Lower temperatures must be reached by increasing levels of refrigeration, which are both costly and inconvenient, especially for remote and off-shore fields. Comparing this example with the process of the invention, Example 1, case (d), it can be seen that even refrigeration to 0° C. does not achieve as good results as the process of the invention, in which cooling to only 30° C. is used.

Example 3

A set of calculations was performed to evaluate the performance of the process of the invention as a function of the membrane area that is used. The assumptions were as in Example 1, case (d), that is condensation at 30° C., followed by membrane separation and return of the heavy hydrocarbon-enriched stream to be brought into equilibrium with the feed stream. The calculations were carried out using ChemCad III and assuming a fixed set of membrane areas to perform the separation. The results are summarized in Table 11.

TABLE 11

| Membrane area (m$^2$) | Permeate compressor (hp) | NGL production (lb/h) | Gas production (lb/h) | C$_{4+}$ hydrocarbon content in gas (mol %) | Methane content in gas (mol %) |
|---|---|---|---|---|---|
| 0 | — | 1,374 | 3,927 | 14.3 | 49 |
| 25 | 37 | 1,909 | 3,392 | 9.8 | 53 |
| 50 | 73 | 2,270 | 3,030 | 6.7 | 56 |
| 75 | 108 | 2,512 | 2,788 | 4.7 | 58 |
| 100 | 144 | 2,682 | 2,619 | 3.3 | 60 |
| 200 | 290 | 3,036 | 2,263 | 1.1 | 65 |

It can be seen that the NGL production can be increased and the heavier hydrocarbon content of the gas can be reduced by using more membrane area. However, the horsepower capacity of the compressor required to recompress the increased permeate fraction to 150 psia also increases. The balance between performance and costs can be made to fit any specific set of circumstances.

Example 4

(Not in Accordance with the Invention)

Examples 1–3 are based on the NGL being produced from the phase separator at a temperature of 35° C. and a pressure of 150 psia.

To obtain an NGL product that is stable at a higher storage temperature would require the phase separator to be operated at higher temperature and/or lower pressure. A set of calculations was performed to estimate the loss of hydrocarbon as gas that would occur under different phase separator conditions, assuming no treatment of the gas from the separator. The calculations were carried out using ChemCad III, and otherwise the same assumptions as in Example 1, case (a). Table 12 summarizes the results obtained assuming the phase separator pressure is 150 psia, but the temperature is varied.

TABLE 12

| Temperature (°C.) | NGL produced (lb/h) | Gas produced (lb/h) | C$_{4+}$ hydrocarbon content of gas (mol %) | Methane content of gas (mol %) |
|---|---|---|---|---|
| 35 | 1,374 | 3,927 | 14.3 | 49.1 |
| 45 | 1,242 | 4,059 | 15.1 | 48.2 |
| 55 | 1,164 | 4,137 | 15.5 | 47.7 |

As can be seen, attempting to stabilize the NGL at a higher temperature results in increased and significant loss of C$_{4+}$ hydrocarbons in the gas.

Example 5

The calculations of Example 4 were repeated, that is, the phase separator was assumed to be operated at 35° C., 45° C. and 55° C. In this case, however, it was assumed that the process of the invention as in Example 1(d) was used. The results are summarized in Table 13.

TABLE 13

| Temperature (°C.) | NGL produced (lb/h) | Gas produced (lb/h) | Membrane area (m$^2$) | Permeate compressor (hp) | C$_{4+}$ hydrocarbon content of gas (mol %) | Methane content of gas (mol %) |
|---|---|---|---|---|---|---|
| 35 | 2,176 | 3,123 | 42 | 62 | 7.6 | 55 |
| 45 | 2,187 | 3,111 | 58 | 87 | 6.8 | 55 |
| 55 | 2,199 | 3,102 | 70 | 108 | 6.0 | 55 |

As can be seen, the process of the invention can provide more NGL product and a lighter gas fraction than the prior art process of Example 4, even when the phase separator is operated at 55° C.

Example 6

A calculation was performed to model the performance of the process of the invention when the return stream from the membrane unit is equilibrated with the stream entering the phase separator in multiple partitioning stages. As before, the calculations were done with ChemCad III software. This process design was assumed to be as shown in FIG. 4, with the raw condensate stream, which has a high vapor content, separated in preliminary phase separator 404 before being passed without further pressure reduction to phase separator 406, which was assumed to provide three partitioning stages. All other assumptions were as in Example 1(d). The compositions and flow rates of the streams were calculated to be as shown in Tables 14 and 15.

TABLE 14

| Stream | 401 | 405 | 407 | 411 | 413 | 410 | 414 | 416 | 417 | 421 |
|---|---|---|---|---|---|---|---|---|---|---|
| Flow (lbmol/h) | 152 | 132 | 19.4 | 201 | 6.3 | 68.9 | 195 | 93.2 | 102 | 49.9 |
| Temp. (°C.) | −10 | 35 | 35 | 37 | 30 | 41 | 30 | 23 | 23 | 35 |
| Pressure (psia) | 1,000 | 150 | 150 | 150 | 150 | 150 | 150 | 15 | 150 | 150 |
| Component (mol %): | | | | | | | | | | |
| Methane | 42.5 | 48.3 | 2.7 | 39.4 | 2.4 | 22.2 | 40.6 | 16.4 | 62.7 | 1.3 |
| Ethane | 17.1 | 18.8 | 5.3 | 23.3 | 7.2 | 32.0 | 23.8 | 27.0 | 20.9 | 9.1 |
| Propane | 17.2 | 17.5 | 14.8 | 21.3 | 19.9 | 28.5 | 21.3 | 30.7 | 12.8 | 26.2 |
| n-Butane | 14.6 | 12.0 | 32.4 | 12.5 | 35.8 | 13.6 | 11.8 | 21.2 | 3.1 | 38.0 |
| n-Pentane | 3.9 | 2.1 | 15.8 | 2.2 | 14.9 | 2.3 | 1.8 | 3.4 | 0.3 | 11.1 |
| n-Hexane | 4.8 | 1.2 | 28.9 | 1.3 | 19.7 | 1.4 | 0.7 | 1.4 | 0.09 | 14.3 |

TABLE 15

| Stream | 401 | 405 | 407 | 411 | 413 | 410 | 414 | 416 | 417 | 421 |
|---|---|---|---|---|---|---|---|---|---|---|
| Flow (lb/h) | 5,301 | 4,066 | 1,235 | 6,582 | 377 | 2,516 | 6,206 | 3,747 | 2,459 | 2,843 |
| Component flow (lb/h): | | | | | | | | | | |
| Methane | 1,035 | 1,027 | 8.4 | 1,272 | 2.4 | 245 | 1,270 | 245 | 1,025 | 10.2 |
| Ethane | 778 | 747 | 30.9 | 1,411 | 13.7 | 664 | 1,397 | 756 | 641 | 137 |
| Propane | 1,149 | 1,023 | 127 | 1,889 | 55.3 | 866 | 1,833 | 1,260 | 573 | 576 |
| n-Butane | 1,288 | 923 | 365 | 1,466 | 131 | 543 | 1,335 | 1,149 | 186 | 1,102 |
| n-Pentane | 427 | 205 | 221 | 319 | 67.5 | 114 | 252 | 226 | 25.4 | 401 |
| n-Hexane | 624 | 141 | 483 | 225 | 107 | 84.6 | 118 | 111 | 7.7 | 616 |

Membrane area required: 75 m$^2$
Horsepower requirement: 99 hp

The results of these calculations are compared with those for Example 1(d), with one partitioning stage, and for condensation treatment only in Table 16.

TABLE 16

| Treatment | NGL produced (lb/h) | Gas produced (lb/h) | Methane content of gas (mol %) |
|---|---|---|---|
| Condensation at 30° C. | 1,374 | 3,927 | 49.1 |
| Process of the Invention-One Partitioning Stage | 2,512 | 2,788 | 58.2 |
| Process of the Invention-Three Partitioning Stages | 2,843 | 2,459 | 62.7 |

As can be seen, using three partitioning stages obtains a better result than a single partitioning stage for essentially the same amount of membrane area and horsepower requirement.

Example 7

Examples 1–6 illustrate the invention as it relates to processes that use membranes selective for the heavier hydrocarbons over methane. A similar calculation was performed, but this time assuming that the membrane is selective for methane over the heavier hydrocarbons, with the following permeation properties:

| Gas: | Methane | Pressure normalized flux | 20 |
|---|---|---|---|
| | Ethane | (× 10$^{-6}$ cm$^3$ (STP)/cm$^2$ · s · cmHg) | 10 |
| | Propane | | 5 |

| | | |
|---|---|---|
| n-Butane | | 2 |
| n-Pentane | | 1 |
| n-Hexane | | 1 |

The process design was assumed to be as in Example 1(d), except that the residue stream from the membrane unit now forms the heavier hydrocarbon enriched stream that is returned to equilibrate with the feed, and the permeate stream forms the gas product stream. Other assumptions, including the feed stream composition and the conditions of condensation, were as in Example 1, case (d). As before, the calculations were carried out using ChemCad III. The calculated compositions and flow rates of the streams were as shown in Tables 17 and 18, where the stream notation is as in FIG. 3, except for the membrane residue and permeate streams.

Comparing this example with Example 1(d), it can be seen that comparable results can be obtained, but that the membrane area and horsepower requirements are much higher.

TABLE 17

| Stream | 304 | 309 | 312 | 311 | Permeate product gas | Residue |
|---|---|---|---|---|---|---|
| Flow (lbmol/h) | 152 | 191 | 5.3 | 186 | 111 | 74.8 |
| Temp. (°C.) | 35 | 35 | 30 | 30 | 44 | 44 |
| Pressure (psia) | 150 | 150 | 150 | 150 | 15 | 150 |

TABLE 17-continued

| Stream | 304 | 309 | 312 | 311 | Permeate product gas | Residue |
|---|---|---|---|---|---|---|
| Component (mol %): | | | | | | |
| Methane | 42.5 | 39.4 | 25 | 40.5 | 57.1 | 15.7 |
| Ethane | 17.1 | 19.4 | 6.0 | 19.7 | 21.3 | 17.5 |
| Propane | 17.2 | 23.1 | 21.8 | 23.1 | 16.3 | 33.2 |
| n-Butane | 14.6 | 15.4 | 44.2 | 14.6 | 5.0 | 28.9 |
| n-Pentane | 3.9 | 2.0 | 13.3 | 1.6 | 0.3 | 3.6 |
| n-Hexane | 4.8 | 0.8 | 12.3 | 0.4 | 0.08 | 1.0 |

TABLE 18

| Stream | 304 | 309 | 312 | 311 | Permeate product gas | Residue |
|---|---|---|---|---|---|---|
| Flow (lb/h) | 5,301 | 6,388 | 307 | 6,081 | 2,884 | 3,196 |
| Component flow (lb/h): | | | | | | |
| Methane | 1,035 | 1,211 | 2.1 | 1,209 | 1,020 | 189 |
| Ethane | 778 | 1,114 | 9.6 | 1,105 | 712 | 393 |
| Propane | 1,149 | 1,947 | 51.0 | 1,896 | 800 | 1,096 |
| n-Butane | 1,288 | 1,717 | 137 | 1,580 | 321 | 1,259 |
| n-Pentane | 427 | 272 | 51.0 | 221 | 24.0 | 197 |
| n-Hexane | 624 | 127 | 56.2 | 70.4 | 7.7 | 62.8 |

Membrane area required: 5,000 m$^2$
Horsepower requirement: 136 hp

Example 8

A calculation was performed to model the performance of the process of the invention according to the embodiment of FIG. 5, in which the overhead gas from the phase separator is recompressed before cooling and membrane separation treatment. In this case, therefore, the membrane separation step produces a high pressure residue product gas stream. The permeate stream is at 250 psia and is, therefore, not recompressed before passing to the phase separator. The process was assumed to treat 5,800 lb/h, that is 37,000 gallons/day (gpd), of raw condensate of the composition shown in column 501 of Table 19, and at 1,000 psia. The phase separator was assumed to operate at 250 psia and 35° C. Compressor 506 was assumed to repressurize the gas to 1,000 psia, and condenser 507 was assumed to cool the gas to 35° C. As before, the calculations were done with ChemCad III software. The results of the calculations are summarized in Table 19.

TABLE 19

| Stream | 501 | 505 | 508 | 509 | 511 | 512 | 513 |
|---|---|---|---|---|---|---|---|
| Flow (lb/h) | 5,802 | 10,710 | 3,862 | 6,848 | 2,351 | 1,510 | 3,448 |
| Temp. (°C.) | −1o | 35 | 35 | −10 | 20 | 20 | 35 |
| Pressure (psia) | 1,000 | 250 | 1,000 | 250 | 1,000 | 250 | 250 |
| Component (mol %): | | | | | | | |
| Methane | 43.5 | 41.2 | 56.8 | 29.3 | 67.8 | 33.0 | 4.4 |
| Ethane | 17.0 | 26.3 | 24.7 | 27.4 | 20.2 | 34.5 | 11.7 |
| Propane | 17.1 | 22.2 | 14.4 | 28.1 | 9.9 | 24.2 | 28.8 |
| n-Butane | 14.2 | 9.0 | 3.8 | 13.0 | 2.0 | 7.6 | 33.9 |

TABLE 19-continued

| Stream | 501 | 505 | 508 | 509 | 511 | 512 | 513 |
|---|---|---|---|---|---|---|---|
| n-Pentane | 3.8 | 0.9 | 0.2 | 1.5 | 0.1 | 0.5 | 9.7 |
| n-Hexane | 4.4 | 0.4 | 0.1 | 0.7 | 0.03 | 0.1 | 11.4 |

Membrane area required: 11 m$^2$
Horsepower requirement: 265 hp

As can be seen from the table, the process produces 17,984 gpd (3,448 lb/h) of NGL (stream 513), with a methane content of 4.4 mol %, and 2,351 lb/h of gas, with a content of 2.1 mol % $C_{4+}$ hydrocarbons.

Example 9

(Not in Accordance with the Invention)

A calculation was performed to compare the performance of the invention as in Example 8, with a similar process in which no membrane separation is used. In other words, the overhead gas from the separator is simply recompressed to 1,000 psia and cooled to 35° C., so that a portion of the heavier components condenses out and is returned to the phase separator. The results are summarized in Table 20.

TABLE 20

| Stream | Raw NGL | Overhead gas | Condensate | Gas product | NGL product |
|---|---|---|---|---|---|
| Flow (lb/h) | 5,802 | 5,696 | 2,854 | 2,841 | 2,962 |
| Temp. (°C.) | 10 | 35 | −7 | 35 | 35 |
| Pressure (psia) | 1,000 | 250 | 250 | 1,000 | 250 |
| Component (mol %): | | | | | |
| Methane | 43.5 | 48.5 | 29.9 | 61.4 | 5.0 |
| Ethane | 17.0 | 21.4 | 22.9 | 20.4 | 9.5 |
| Propane | 17.1 | 19.2 | 27.7 | 13.4 | 25.1 |
| n-Butane | 14.2 | 9.3 | 16.4 | 4.3 | 35.4 |
| n-Pentane | 3.8 | 1.0 | 2.1 | 0.3 | 11.3 |
| n-Hexane | 4.4 | 0.4 | 1.0 | 0.1 | 13.6 |

Horsepower requirement: 150 hp

The prior art process produces 15,191 gpd (2,962 lb/h) of NGL, with a methane content of 5 mol %, and 2,841 lb/h of gas, with a content of 4.7 mol % $C_{4+}$ hydrocarbons.

The attributes of the membrane versus the no-membrane case are summarized in Table 21.

TABLE 21

| Example number | Total hp requirement (hp) | NGL produced (gpd) | Methane content of NGL (mol %) | Membrane area needed (m$^2$) |
|---|---|---|---|---|
| 8 With membrane | 265 | 17,984 | 4.4 | 11 |
| 9 No membrane | 150 | 15,191 | 5.0 | 0 |

Under the assumed conditions, the process of the invention produces 2,793 gpd more NGL than the prior art process, or over 1 million gallons per year more NGL. The membrane area required to achieve this is very small and the additional compressor horsepower requirements are modest.

Example 10

As can be seen from Table 19 of Example 8, the membrane residue stream (511) and permeate stream (512) are about 15° C. colder than the membrane feed stream (508). A calculation was performed to determine how much cooling could be supplied by the membrane if these streams were used to provide part of the cooling for condenser 507. The results are shown in Table 22.

TABLE 22

|  | Stream | MMBtu/h | % cooling |
|---|---|---|---|
| Cooling required | Stream 505 | 0.0900 | — |
| Cooling supplied | Stream 511 (residue) | 0.0437 | 49 |
|  | Stream 512 (permeate) | 0.0463 | 51 |
|  | External cooling | 0 | 0 |

As can be seen, the membrane unit could be used to provide all of the cooling required for condenser 507. Under these conditions, we calculated in fact that the feed entering the membrane unit can be cooled to 20° C., rather than 35° C. as previously. This would reduce the membrane area and horsepower requirements of the process to achieve comparable results, or with the same membrane area and horsepower could increase the separation if needed.

We claim:

1. A process for stabilizing natural gas liquid (NGL) containing $C_{3+}$ hydrocarbons, comprising the following steps:
   (a) subjecting a raw NGL stream to phase separation by pressure reduction, thereby producing a stabilized NGL stream and a gas stream;
   (b) cooling said gas stream, thereby removing a portion of said $C_{3+}$ hydrocarbons as a liquid condensate from said gas stream, and leaving a non-condensed stream;
   (c) subjecting said non-condensed stream to membrane separation, thereby producing a product gas stream enriched in methane compared with said non-condensed stream, and a heavy stream enriched in $C_{3+}$ hydrocarbons compared with said non-condensed stream;
   (d) returning said heavy stream to bring said heavy stream into equilibrating contact with said raw NGL stream in step (a).

2. The process of claim 1, wherein said equilibrating contact is achieved in one theoretical partitioning stage.

3. The process of claim 1, wherein said equilibrating contact is achieved in multiple theoretical partitioning stages.

4. The process of claim 1, wherein said phase separation step (a) is carried out in a demethanizer column.

5. The process of claim 1, wherein said phase separation step (a) is carried out at a pressure of at least about 50 psia.

6. The process of claim 1, wherein said phase separation step (a) is carried out at a pressure of at least about 100 psia.

7. The process of claim 1, wherein said phase separation step (a) is carried out at a pressure of at least about 150 psia.

8. The process of claim 1, wherein said phase separation step (a) is carried out at a pressure of at least about 200 psia.

9. The process of claim 1, wherein said equilibrating contact is achieved by mixing said heavy stream with said raw NGL stream prior to passing said raw NGL stream into a phase separation vessel.

10. The process of claim 1, wherein said equilibrating contact is achieved by mixing said heavy stream with said raw NGL stream in a motionless mixer.

11. The process of claim 1, wherein said equilibrating contact is achieved by mixing said heavy stream with said raw NGL stream in an eductor.

12. The process of claim 1, wherein said equilibrating contact is achieved by running said heavy stream in countercurrent absorption/stripping contact against at least a portion of said raw NGL stream.

13. The process of claim 1, wherein said phase separation step (a) is carried out in a demethanizer column, and wherein said equilibrating contact is achieved by introducing said heavy stream into said demethanizer column.

14. The process of claim 1, wherein said membrane separation step (c) is carried out using a membrane selective for said $C_{3+}$ hydrocarbons over methane.

15. The process of claim 1, further comprising returning said liquid condensate to said phase separation step.

16. The process of claim 1, wherein said membrane separation step (c) removes at least about 10 vol % of the $C_{3+}$ hydrocarbons from the non-condensed stream into the heavy stream.

17. The process of claim 1, wherein said membrane separation step (c) removes at least about 50 vol % of the $C_{3+}$ hydrocarbons from the non-condensed stream into the heavy stream.

18. The process of claim 1, wherein said membrane separation step (c) removes at least about 90 vol % of the $C_{3+}$ hydrocarbons from the non-condensed stream into the heavy stream.

19. The process of claim 1, further comprising compressing said gas stream prior to said membrane separation step (c).

20. The process of claim 1, further comprising compressing said gas stream prior to said cooling step (b).

21. The process of claim 1, further comprising passing said product gas stream to a gas pipeline.

22. The process of claim 1, wherein said phase separation step (a) is carried out in two sub-steps at progressively lower pressure, producing a first gas stream and a second, lower pressure gas stream, and wherein said cooling step (b) and said membrane separation step (c) are carried out on at least one of said first and second gas streams.

23. The process of claim 22, wherein at least portions of said first and second gas streams are combined for treatment in said membrane separation step (c).

24. The process of claim 1, wherein said cooling is achieved at least in part by heat exchange against said product gas stream.

25. The process of claim 1, wherein said cooling is achieved at least in part by heat exchange against said heavy stream.

26. A process for stabilizing natural gas liquid (NGL) containing $C_{3+}$ hydrocarbons, comprising the following steps:
   (a) subjecting a raw NGL stream to phase separation by pressure reduction, thereby producing a stabilized NGL stream and a gas stream;
   (b) compressing and cooling said gas stream, thereby removing a portion of said $C_{3+}$ hydrocarbons as a liquid condensate from said gas stream, and leaving a non-condensed stream;
   (c) subjecting said non-condensed stream to membrane separation, thereby producing a product gas stream enriched in methane compared with said non-condensed stream, and a heavy stream enriched in $C_{3+}$ hydrocarbons compared with said non-condensed stream;
   (d) returning said heavy stream to bring said heavy stream into equilibrating contact with said raw NGL stream in step (a).

27. The process of claim 26, wherein said equilibrating contact is achieved in one theoretical partitioning stage.

28. The process of claim 26, wherein said equilibrating contact is achieved in multiple theoretical partitioning stages.

29. The process of claim 26, wherein said phase separation step (a) is carried out in a demethanizer column.

30. The process of claim 26, wherein said phase separation step (a) is carried out at a pressure of at least about 50 psia.

31. The process of claim 26, wherein said phase separation step (a) is carried out at a pressure of at least about 100 psia.

32. The process of claim 26, wherein said phase separation step (a) is carried out at a pressure of at least about 150 psia.

33. The process of claim 26, wherein said phase separation step (a) is carried out at a pressure of at least about 200 psia.

34. The process of claim 26, wherein said equilibrating contact is achieved by mixing said heavy stream with said raw NGL stream prior to passing said raw NGL stream into a phase separation vessel.

35. The process of claim 26, wherein said equilibrating contact is achieved by mixing said heavy stream with said raw NGL stream in a motionless mixer.

36. The process of claim 26, wherein said equilibrating contact is achieved by mixing said heavy stream with said raw NGL stream in an eductor.

37. The process of claim 26, wherein said equilibrating contact is achieved by running said heavy stream in countercurrent absorption/stripping contact against at least a portion of said raw NGL stream.

38. The process of claim 26, wherein said phase separation step (a) is carried out in a demethanizer column, and wherein said equilibrating contact is achieved by introducing said heavy stream into said demethanizer column.

39. The process of claim 26, wherein said step (b) is carried out in two sub-steps as follows:
   (i) compressing and cooling said gas stream, thereby condensing a portion of said $C_{3+}$ hydrocarbons, and leaving an intermediate gas stream;
   (ii) compressing and cooling said intermediate gas stream, thereby removing a portion of said $C_{3+}$ hydrocarbons as a liquid condensate from said intermediate gas stream, and leaving a non-condensed stream.

40. The process of claim 39, wherein said non-condensed stream has a pressure of at least about 1,000 psia.

41. The process of claim 26, wherein said membrane separation step (c) is carried out using a membrane selective for said $C_{3+}$ hydrocarbons over methane.

42. The process of claim 26, wherein said non-condensed stream has a pressure of at least about 1,000 psia.

43. The process of claim 26, further comprising returning said liquid condensate to said phase separation step.

44. The process of claim 26, wherein said membrane separation step (c) removes at least about 10 vol % of the $C_{3+}$ hydrocarbons from the non-condensed stream into the heavy stream.

45. The process of claim 26, wherein said membrane separation step (c) removes at least about 50 vol % of the $C_{3+}$ hydrocarbons from the non-condensed stream into the heavy stream.

46. The process of claim 26, wherein said membrane separation step (c) removes at least about 90 vol % of the $C_{3+}$ hydrocarbons from the non-condensed stream into the heavy stream.

47. The process of claim 26, further comprising passing said product gas to a gas pipeline.

48. The process of claim 26, wherein said phase separation step (a) is carried out in two sub-steps at progressively lower pressure, producing a first gas stream and a second, lower pressure gas stream, and wherein said cooling step (b) and said membrane separation step (c) are carried out on at least one of said first and second gas streams.

49. The process of claim 48, wherein at least portions of said first and second gas streams are combined for treatment in said membrane separation step (c).

50. The process of claim 26, wherein said cooling is achieved at least in part by heat exchange against said product gas stream.

51. The process of claim 26, wherein said cooling is achieved at least in part by heat exchange against said heavy stream.

52. The process of claim 26, further comprising introducing an additional stream for treatment by said process at said compressing and cooling step (b).

53. Apparatus for stabilizing natural gas liquid (NGL) containing $C_{3+}$ hydrocarbons, comprising:
   (a) phase separator means having a fluid inlet by which fluid for separation can enter and a gas outlet from which gas can be withdrawn;
   (b) condensing means connected to an outlet from said phase separator means such that gas exiting said phase separator means can be cooled and partially condensed in said condensing means;
   (e) a membrane separation unit, containing a membrane having a feed side and a permeate side and being selective for said $C_{3+}$ hydrocarbons over methane, and connected to said condensing means such that non-condensed gas from said condensing means can flow across said feed side, and connected to said phase separator means such that gas from said permeate side can be returned to said phase separator means, in such a manner as to bring said gas from said permeate side into equilibrating contact with said fluid for separation in said phase separator means, and having a residue gas outlet from which gas can be withdrawn.

54. The apparatus of claim 53, further comprising a compressor connected between said phase separator means and said condensing means.

* * * * *